(12) United States Patent
Li

(10) Patent No.: US 10,707,933 B2
(45) Date of Patent: Jul. 7, 2020

(54) ADAPTIVE ANTENNA SWITCHING SYSTEM AND SWITCHING METHOD, AND INTELLIGENT TERMINAL

(71) Applicant: XI'AN YEP TELECOMMUNICATION TECHNOLOGY., LTD, Xi'an (CN)

(72) Inventor: Wei Li, Xi'an (CN)

(73) Assignee: XI'AN YEP TELECOMMUNICATION TECHNOLOGY., LTD., Xi'an, Shaanxi (CN)

( * ) Notice: Subject to any disclaimer, the term of this patent is extended or adjusted under 35 U.S.C. 154(b) by 0 days.

(21) Appl. No.: 16/430,716

(22) Filed: Jun. 4, 2019

(65) Prior Publication Data
US 2019/0288755 A1   Sep. 19, 2019

Related U.S. Application Data

(63) Continuation of application No. PCT/CN2016/113036, filed on Dec. 29, 2016.

(51) Int. Cl.
*H04B 7/06* (2006.01)
*H04B 17/327* (2015.01)
(Continued)

(52) U.S. Cl.
CPC ............ *H04B 7/0608* (2013.01); *H04B 7/04* (2013.01); *H04B 17/327* (2015.01); *H04B 17/382* (2015.01); *H04W 36/03* (2018.08)

(58) Field of Classification Search
CPC ...... H04B 7/0608; H04B 7/04; H04B 17/382; H04B 17/327; H04B 7/0814; H04B 17/318; H04W 36/03
See application file for complete search history.

(56) References Cited

U.S. PATENT DOCUMENTS

| 2009/0124214 | A1  | 5/2009 | Zhang et al. |
| 2015/0140943 | A1* | 5/2015 | Khayrallah ............ H04B 7/082 455/277.1 |

(Continued)

FOREIGN PATENT DOCUMENTS

| CN | 101465454 A | 6/2009 |
| CN | 204156853 U | 2/2015 |

(Continued)

OTHER PUBLICATIONS

International Search Report (and English Translation) and Written Opinion of the International Searching Authority for International Application No. PCT/CN2016/113036 dated Aug. 30, 2017.

*Primary Examiner* — Dac V Ha
(74) *Attorney, Agent, or Firm* — Heslin Rothenberg Farley & Mesiti P.C.

(57) ABSTRACT

The present disclosure discloses an adaptive antenna switching system and switching method, and an intelligent terminal, the method comprises obtaining a first antenna module corresponding to a first front-end module; and when the first antenna module meets a switching condition, matching the first front-end module with the first antenna module match, and performing data interaction through the first antenna module. The antenna module in the present disclosure is capable of adaptive adjustment according to a usage condition of a user, which ensures that an antenna state can be dynamically switched in real time when one or more antenna modules therein exhibit severe signal attenuation or abnormal signal interruption within a period, thus ensuring that wireless performance of the first front-end module currently used by a user is maintained at an optimal level, and improving user experience of the intelligent terminal.

20 Claims, 9 Drawing Sheets

(51) Int. Cl.
*H04B 17/382* (2015.01)
*H04W 36/00* (2009.01)
*H04B 7/04* (2017.01)

(56) References Cited

U.S. PATENT DOCUMENTS

2015/0171955 A1* 6/2015 Olesen .................. H04B 7/265
 370/252
2017/0033830 A1* 2/2017 Ramachandran ........ H04B 1/44
2017/0331531 A1* 11/2017 Wu ...................... H04B 7/0417

FOREIGN PATENT DOCUMENTS

| CN | 105553505 A | 5/2016 |
| CN | 105577252 A | 5/2016 |

* cited by examiner

ADAPTIVE ANTENNA SWITCHING SYSTEM AND SWITCHING METHOD, AND INTELLIGENT TERMINAL

CROSS-REFERENCE TO RELATED APPLICATIONS

The present application is a continuation of International Application Serial No. PCT/CN2016/113036, filed on Dec. 29, 2016, which is incorporated herein by reference in its entirety.

TECHNICAL FIELD

The present disclosure relates to the technical field of mobile communications, and in particular, to an adaptive antenna switching system and switching method, and an intelligent terminal.

BACKGROUND

As an intelligent terminal carries more and more wireless modules, the number and types of antennas on the intelligent terminal grow continuously. Users have higher requirements on wireless performance of the intelligent terminal, including an Internet speed, quality of wireless signal communication, and the like. Moreover, an antenna environment of the intelligent terminal is getting worse. Therefore, antenna performance of the intelligent terminal, including a broadband performance, isolation performance, radiation efficiency and an anti-interference performance of an antenna, becomes more attractive.

For the current antenna for an intelligent terminal, an antenna tuning switch is mainly added thereto to control the antenna to select different antenna for matching when operating in different bands, that is, to debug the matching resonance of each operating band of the antenna. However, in such a manner, performance of the antenna may still be severely affected in various extreme environments such as in a multipath fading environment, in an environment of the intellectual terminal being handheld by a user, and in a weak signal area, etc., resulting in an abnormal signal interruption such as a call drop or a network disconnection.

SUMMARY

An objective of the present disclosure is to provide an adaptive antenna switching system and switching method, and an intelligent terminal, so as to resolve the problem in the prior art that usage satisfaction of a user is decreased because antenna switching cannot ensure optimal performance of an antenna after the switching.

To achieve the foregoing objective, the present disclosure is implemented through the following technical solution.

An adaptive antenna switching method, comprising steps of:

obtaining a first antenna module corresponding to a first front-end module; and matching the first front-end module with the first antenna module when the first antenna module meets a switching condition, and performing data interaction through the first antenna module;

wherein the first front-end module is a front-end module selected from a first set according to a first selection rule; the first antenna module is an antenna module selected from a second set according to a second selection rule; the first set is a set of all front-end modules; the second set is a set of all antenna modules; the first selection rule is set for selecting a front-end module with the highest priority currently according to a priority order for front-end modules; and the second selection rule is used for selecting an antenna module with the highest priority currently according to a priority order for antenna modules.

Preferably, the antenna switching method further comprises:

obtaining a second antenna module corresponding to a second front-end module; and matching the second front-end module with the second antenna module when the second antenna module meets the switching condition, and performing data interaction through the second antenna module;

wherein the second front-end module is a front-end module selected from a third set according to the first selection rule; the second antenna module is an antenna module selected from a fourth set according to the second selection rule; the third set is a set of all unmatched front-end modules in the first set; and the fourth set is a set of all unmatched antenna modules in the second set; or Preferably, the antenna switching method further comprises the following steps before obtaining a first antenna module corresponding to a first front-end module:

performing data interaction of the first front-end module through a third antenna module, the third antenna module being an antenna module currently used by the first front-end module; and confirming that the third antenna module meets a switching triggering condition.

Preferably, the confirming that the third antenna module meets a switching triggering condition specifically comprises:

determining, within a sampling cycle, if a receiving signal strength value of the third antenna module exceeds a receiving signal strength threshold for antenna or if a transmission power value of the third antenna module exceeds a transmission power threshold for antenna; and confirming that the third antenna module meets the switching triggering condition if the receiving signal strength value of the third antenna module exceeds the receiving signal strength threshold for antenna or if the transmission power value of the third antenna module exceeds the transmission power threshold for antenna.

Preferably, confirming that the first antenna module meets a switching condition specifically comprises:

determining if a power difference value between the first antenna module and the third antenna module is greater than or equal to a power difference threshold;

determining if an estimated switching time of the first antenna module is less than a cycle threshold, if the power difference value between the first antenna module and the third antenna module is greater than or equal to the power difference threshold; and confirming that the first antenna module meets the switching condition if the estimated switching time of the first antenna module is less than the cycle threshold.

Preferably, confirming that the first antenna module meets a switching condition specifically comprises:

determining if a receiving power level difference value between the first antenna module and the third antenna module is greater than or equal to a receiving power level difference threshold;

determining if an estimated switching time of the first antenna module is less than a cycle threshold, if the receiving power level difference value between the first antenna module and the third antenna module is greater than or equal to the receiving power level difference threshold; and confirming that the first antenna module meets the switching condition, if the estimated switching time of the first antenna module is less than the cycle threshold.

Preferably, the antenna switching method further comprises:

determining a currently used front-end module among all the front-end modules;

setting a priority of the currently used front-end module to be the highest in the priority order for front-end modules.

Preferably, the antenna switching method further comprises:

obtaining start time for current usage of each front-end module; and sorting priorities of the front-end modules in ascending order according to a chronological order of the start time for current usage of respective front-end modules.

Preferably, the antenna switching method further comprises:

sorting priorities of the antenna modules in descending order according to average strength values of all the antenna modules within a sampling cycle, to form the priority order for antenna modules;

wherein the average strength value of each antenna module is specifically calculated as follows:

$$I_{vi} = \frac{avgRSSI_i - avgTX_i}{2},$$

wherein $avgRSSI_i$ is an average receiving signal strength value of an ith antenna module within the sampling cycle, $avgTX_i$ is an average transmission power value of the ith antenna module within the sampling cycle, wherein i=1, 2, etc.

Preferably, in the step of determining if a power difference value between the first antenna module and the third antenna module is greater than or equal to a power difference threshold:

the power difference between the first antenna module and the third antenna module is specifically calculated as follows:

$$\Delta \frac{avgRSSI - avgTX}{2} = \frac{avgRSSI_{optim} - avgTX_{optim}}{2} - \frac{avgRSSI_{former} - avgTX_{former}}{2}$$

wherein $avgRSSI_{optim}$ is an average receiving signal strength value of the first antenna module within a sampling cycle, and $avgTX_{optim}$ is an average transmission power value of the first antenna module within the sampling cycle; and $avgRSSI_{former}$ is an average receiving signal strength value of the third antenna module within the sampling cycle, and $avgTX_{former}$ is an average transmission power value of the third antenna module within the sampling cycle.

Preferably, the step of determining if an estimated switching time of the first antenna module is less than a cycle threshold, if the power difference value between the first antenna module and the third antenna module is greater than or equal to the power difference threshold, specifically comprises:

determining if the estimated switching time of the first antenna module is less than the cycle threshold, if $$\Delta \frac{avgRSSI - avgTX}{2}$$

is greater than or equal to the power difference threshold; or the step of determining if an estimated switching time of the first antenna module is less than a cycle threshold, if the receiving power level difference value between the first antenna module and the third antenna module is greater than or equal to the receiving power level difference threshold, specifically comprises:

determining if the estimated switching time of the first antenna module is less than the cycle threshold, if the receiving power level difference value between the first antenna module and the third antenna module is greater than or equal to the receiving power level difference threshold;

wherein the estimated switching time T1 is:

$$T1 = \Delta \frac{avgRSSI - avgTX}{2} \cdot bwt,$$

wherein, bwt representing an antenna residence time;

$$\Delta \frac{avgRSSI - avgTX}{2} = \frac{avgRSSI_{optim} - avgTX_{optim}}{2} - \frac{avgRSSI_{former} - avgTX_{former}}{2};$$

wherein $avgRSSI_{optim}$ is an average receiving signal strength value of the first antenna module within a sampling cycle, and $avgTX_{optim}$ is an average transmission power value of the first antenna module within the sampling cycle;

$avgRSSI_{former}$ is an average receiving signal strength value of the third antenna module within the sampling cycle, and $avgTX_{former}$ is an average transmission power value of the third antenna module within the sampling cycle.

An adaptive antenna switching system comprises at least three front-end modules with different application functions, at least three antenna modules, and an antenna matrix management switch module, wherein the antenna matrix management switch module obtains a first antenna module corresponding to a first front-end module;

the antenna matrix management switch module controls the first front-end module and the first antenna module to match each other when the first antenna module meets a switching condition, and performs data interaction through the first antenna module;

wherein the first front-end module is a front-end module selected from a first set according to a first selection rule; the first antenna module is an antenna module selected from a second set according to a second selection rule; the first set is a set of all front-end modules; the second set is a set of all antenna modules; the first selection rule is set for selecting a front-end module with the highest priority currently according to a priority order for front-end modules; and the second selection rule is set for selecting an antenna module with the highest priority currently according to a priority order for antenna modules.

Preferably, the antenna matrix management switch module is further configured to:

obtain a second antenna module corresponding to a second front-end module; and control the second front-end module and the second antenna module to match each other when the second antenna module meets the switching condition, and perform data interaction through the second antenna module;

wherein the second front-end module is a front-end module selected from a third set according to the first selection rule; the second antenna module is an antenna module selected from a fourth set according to the second selection rule; the third set is a set of all unmatched front-end modules in the first set; and the fourth set is a set of all unmatched antenna modules in the second set.

Preferably, the first front-end module performs data interaction through a third antenna module, before the antenna matrix management switch module obtains the first antenna module corresponding to the first front-end module, the third antenna module being an antenna module currently used by the first front-end module; and The antenna matrix management switch module comprises:

a first determining module configured for confirming that the third antenna module meets a switching triggering condition.

Preferably, the first determining module confirming that the third antenna module meets a switching triggering condition specifically comprises:

the first determining module determines within a sampling cycle if a receiving signal strength value of the third antenna module exceeds a receiving signal strength threshold for antenna or if a transmission power value of the third antenna module exceeds a transmission power threshold for antenna; and the first determining module confirms that the third antenna module meets the switching triggering condition if the receiving signal strength value of the third antenna module exceeds the receiving signal strength threshold for antenna or if the transmission power value of the third antenna module exceeds the transmission power threshold for antenna.

Preferably, the antenna matrix management switch module further comprises a second determining module configured for determining if the first antenna module meets the switching condition, wherein, the second determining module determining if the first antenna module meets the switching condition comprises:

the second determining module determines if a power difference value between the first antenna module and the third antenna module is greater than or equal to a power difference threshold;

the second determining module determines if an estimated switching time of the first antenna module is less than a cycle threshold, if the power difference value between the first antenna module and the third antenna module is greater than or equal to the power difference threshold; and the second determining module confirms that the first antenna module meets the switching condition if the estimated switching time of the first antenna module is less than the cycle threshold.

Preferably, the antenna matrix management switch module further comprises a second determining module configured for determining if the first antenna module meets the switching condition, wherein, the second determining module determining if the first antenna module meets the switching condition comprises:

the second determining module determines if a receiving power level difference value between the first antenna module and the third antenna module is greater than or equal to a receiving power level difference threshold;

the second determining module determines if an estimated switching time of the first antenna module is less than a cycle threshold, if the receiving power level difference value between the first antenna module and the third antenna module is greater than or equal to the receiving power level difference threshold; and the second determining module confirms that the first antenna module meets the switching condition, if the estimated switching time of the first antenna module is less than the cycle threshold.

Preferably, the antenna matrix management switch module further comprises: a function sorting module;

the function sorting module determines a currently used front-end module among all the front-end modules;

the function sorting module sets a priority of the currently used front-end module to be the highest in the priority order for front-end modules.

Preferably, the antenna matrix management switch module further comprises: a function sorting module;

the function sorting module obtains a start time for current usage of each front-end module; and the function sorting module sorts priorities of the front-end modules in ascending order according to a chronological order of the start time for current usage of front-end modules.

Preferably, the antenna matrix management switch module further comprises an antenna sorting module;

the antenna sorting module sorts priorities of the antenna modules in descending order according to average strength values of all the antenna modules within a sampling cycle, to form the priority order for antenna modules;

wherein the average strength value of each antenna module is specifically calculated as follows:

$$I_{vi} = \frac{avgRSSI_i - avgTX_i}{2},$$

wherein $avgRSSI_i$ is an average receiving signal strength value of an ith antenna module within the sampling cycle, $avgTX_i$ is an average transmission power value of the ith antenna module within the sampling cycle, wherein i=1, 2, etc.

Preferably, in the determining module determining if a power difference value between the first antenna module and the third antenna module is greater than or equal to a power difference threshold:

the power difference between the first antenna module and the third antenna module is specifically calculated as follows:

$$\Delta \frac{avgRSSI - avgTX}{2} = \frac{avgRSSI_{optim} - avgTX_{optim}}{2} - \frac{avgRSSI_{former} - avgTX_{former}}{2};$$

wherein $avgRSSI_{optim}$ is an average receiving signal strength value of the first antenna module within a sampling cycle, and $avgTX_{optim}$ is an average transmission power value of the first antenna module within the sampling cycle; and avgRSSI$_{former}$ is an average receiving signal strength value of the third antenna module within the sampling cycle, and avgTX$_{former}$ is an average transmission power value of the third antenna module within the sampling cycle.

Preferably, the second determining module determining if an estimated switching time of the first antenna module is less than a cycle threshold, if the power difference value between the first antenna module and the third antenna module is greater than or equal to the power difference threshold, specifically comprises:

the second determining module determines if the estimated switching time of the first antenna module is less than the cycle threshold, if $$\Delta \frac{avgRSSI - avgTX}{2}$$

is greater than or equal to the power difference threshold; or the second determining module determining if an estimated switching time of the first antenna module is less than a cycle threshold, if the receiving power level difference value between the first antenna module and the third antenna module is greater than or equal to the receiving power level difference threshold, specifically comprises:

the second determining module determines if the estimated switching time of the first antenna module is less than the cycle threshold, if the receiving power level difference value between the first antenna module and the third antenna module is greater than or equal to the receiving power level difference threshold;

wherein the estimated switching time T1 is:

$$T1 = \Delta \frac{avgRSSI - avgTX}{2} \cdot bwt,$$

wherein, bwt representing an antenna residence time;

$$\Delta \frac{avgRSSI - avgTX}{2} = \frac{avgRSSI_{optim} - avgTX_{optim}}{2} - \frac{avgRSSI_{former} - avgTX_{former}}{2};$$

wherein avgRSSI$_{optim}$ is an average receiving signal strength value of the first antenna module within a sampling cycle, and avgTX$_{optim}$ is an average transmission power value of the first antenna module within the sampling cycle; and avgRSSI$_{former}$ is an average receiving signal strength value of the third antenna module within the sampling cycle, and avgTX$_{former}$ is an average transmission power value of the third antenna module within the sampling cycle.

An intelligent terminal, comprising an adaptive antenna switching system as described above.

Am adaptive antenna switching system comprises: a processor and at least three antenna modules, wherein, the processor is configured to run at least three front-end modules with different application functions; obtain a first antenna module corresponding to a first front-end module; and control the first front-end module and the first antenna module to match each other when the first antenna module meets a switching condition, and perform data interaction through the first antenna module.

wherein the first front-end module is a front-end module selected from a first set according to a first selection rule; the first antenna module is an antenna module selected from a second set according to a second selection rule; the first set is a set of all front-end modules; the second set is a set of all antenna modules; the first selection rule is set for selecting a front-end module with the current highest priority according to a priority order for front-end modules; and the second selection rule is set for selecting an antenna module with the current highest priority according to a priority order for antenna modules.

Preferably, the processor is configured to:

obtain a second antenna module corresponding to a second front-end module;

and control the second front-end module and the second antenna module to match each other when the second antenna module meets the switching condition, and perform data interaction through the second antenna module;

wherein the second front-end module is a front-end module selected from a third set according to the first selection rule; the second antenna module is an antenna module selected from a fourth set according to the second selection rule; the third set is a set of all unmatched front-end modules in the first set; and the fourth set is a set of all unmatched antenna modules in the second set.

Preferably, the processor controls the first front-end module to perform data interaction through a third antenna module, before obtaining the first antenna module corresponding to the first front-end module, the third antenna module being an antenna module currently used by the first front-end module; and The processor is further configured to confirm that the third antenna module meets a switching triggering condition.

Preferably, the processor confirming that the third antenna module meets a switching triggering condition specifically comprises:

the processor determines, within a sampling cycle, if a receiving signal strength value of the third antenna module exceeds a receiving signal strength threshold for antenna or if a transmission power value of the third antenna module exceeds transmission power threshold for antenna; and the processor confirms that the third antenna module meets the switching triggering condition if the receiving signal strength value of the third antenna module exceeds the receiving signal strength threshold for antenna or if the transmission power value of the third antenna module exceeds the transmission power threshold for antenna.

Preferably, the processor is further configured to determine if a power difference value between the first antenna module and the third antenna module is greater than or equal to a power difference threshold;

the processor determines if an estimated switching time of the first antenna module is less than a cycle threshold, if the power difference value between the first antenna module and the third antenna module is greater than or equal to the power difference threshold; and the processor confirms that the first antenna module meets the switching condition if the estimated switching time of the first antenna module is less than the cycle threshold.

Preferably, the processor determining if the first antenna module meet the switching condition specifically comprises:

the processor determines if a receiving power level difference value between the first antenna module and the third antenna module is greater than or equal to a receiving power level difference threshold;

the second determining module determines if an estimated switching time of the first antenna module is less than a cycle threshold, if the receiving power level difference value between the first antenna module and the third antenna module is greater than or equal to the receiving power level difference threshold; and the second determining module confirms that the first antenna module meets the switching condition, if the estimated switching time of the first antenna module is less than the cycle threshold; or Preferably, the processor is further configured to determine a currently used front-end module among all the front-end modules, and set a priority of the currently used front-end module to be the highest in the priority order for front-end modules; or Preferably, the processor is further configured to obtain start time for current usage of each front-end module; and sort priorities of the front-end modules in ascending order according to a chronological order of the start time for current usage of respective front-end modules.

Preferably, the processor is further configured to sort priorities of the antenna modules in descending order according to average strength values of all the antenna modules within a sampling cycle, to form the priority order for antenna modules;

wherein the average strength value of each antenna module is specifically calculated as follows:

$$I_{vi} = \frac{avgRSSI_i - avgTX_i}{2},$$

wherein an average receiving signal strength value of an ith antenna module within the sampling cycle, $avgTX_i$ is an average transmission power value of the ith antenna module within the sampling cycle, wherein i=1, 2, etc.

Preferably, in the process of the processor determining if a power difference value between the first antenna module and the third antenna module is greater than or equal to a power difference threshold:

the power difference between the first antenna module and the third antenna module is specifically calculated as follows:

$$\Delta \frac{avgRSSI - avgTX}{2} = \frac{avgRSSI_{optim} - avgTX_{optim}}{2} - \frac{avgRSSI_{former} - avgTX_{former}}{2};$$

wherein $avgRSSI_{optim}$ is an average receiving signal strength value of the first antenna module within a sampling cycle, and $avgTX_{optim}$ is an average transmission power value of the first antenna module within the sampling cycle; and $avgRSSI_{former}$ is an average receiving signal strength value of the third antenna module within the sampling cycle, and $avgTX_{former}$ is an average transmission power value of the third antenna module within the sampling cycle.

Preferably, the processor determining if an estimated switching time of the first antenna module is less than a cycle threshold, if the power difference value between the first antenna module and the third antenna module is greater than or equal to the power difference threshold, specifically comprises:

the processor determines if the estimated switching time of the first antenna module is less than the cycle threshold, if $$\Delta \frac{avgRSSI - avgTX}{2}$$

is greater than or equal to the power difference threshold; or the processor determining if an estimated switching time of the first antenna module is less than a cycle threshold, if the receiving power level difference value between the first antenna module and the third antenna module is greater than or equal to the receiving power level difference threshold, specifically comprises:

the processor determines if the estimated switching time of the first antenna module is less than the cycle threshold, if the receiving power level difference value between the first antenna module and the third antenna module is greater than or equal to the receiving power level difference threshold;

wherein the estimated switching time T1 is:

$$T1 = \Delta \frac{avgRSSI - avgTX}{2} \cdot bwt,$$

wherein, bwt representing an antenna residence time;

$$\Delta \frac{avgRSSI - avgTX}{2} = \frac{avgRSSI_{optim} - avgTX_{optim}}{2} - \frac{avgRSSI_{former} - avgTX_{former}}{2};$$

wherein $avgRSSI_{optim}$ is an average receiving signal strength value of the first antenna module within a sampling cycle, and $avgTX_{optim}$ is an average transmission power value of the first antenna module within the sampling cycle; and $avgRSSI_{former}$ is an average receiving signal strength value of the third antenna module within the sampling cycle, and $avgTX_{former}$ is an average transmission power value of the third antenna module within the sampling cycle.

In an adaptive antenna switching system and switching method, and an intelligent terminal disclosed in the present disclosure, a first antenna module corresponding to a first front-end module is obtained; and when the first antenna module meets a switching condition, the first front-end module and the first antenna module match each other, and data interaction is performed through the first antenna module. The first front-end module is a front-end module selected from a first set according to a first selection rule; the first antenna module is an antenna module selected from a second set according to a second selection rule; the first set is a set of all front-end modules; the second set is a set of all antenna modules; the first selection rule is set for selecting a front-end module with the highest priority currently according to a priority order for front-end modules; and the second selection rule is set for selecting an antenna module with the highest priority currently according to a priority order for antenna modules. The antenna module in the present disclosure is capable of adaptive adjustment according to a usage condition of a user, which ensures that an antenna state can be dynamically switched in real time when one or more antenna modules therein exhibit severe signal attenuation or abnormal signal interruption occur in the one or more modules within a period of time, thus ensuring that wireless performance of the first front-end module currently used by the user is maintained at an optimal level, and greatly improving user experience of the intelligent terminal.

DETAILED DESCRIPTION

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative work shall fall within the protection scope of the present disclosure.

With the evolution of technologies, an intelligent terminal may carry several antennas mainly for improving the performance of wireless communication. However, isolation among antennas of the intelligent terminal needs to be taken into consideration, so as to ensure that the isolation between antennas reaches 10 dB or higher. Moreover, the intelligent terminal has to undergo certification tests for various strict wireless module co-existence scenario, to ensure the antenna function of the whole intelligent terminal. Embodiments of the present disclosure provide implementations of multi-antenna adaptive switching. Descriptions are made below by using three antennas as an example. When a terminal device has more antennas, a person skilled in the art may implement a similar solution and achieve a similar technical effect without creative work by using implementations provided in the embodiments of the present disclosure.

Figure 1:
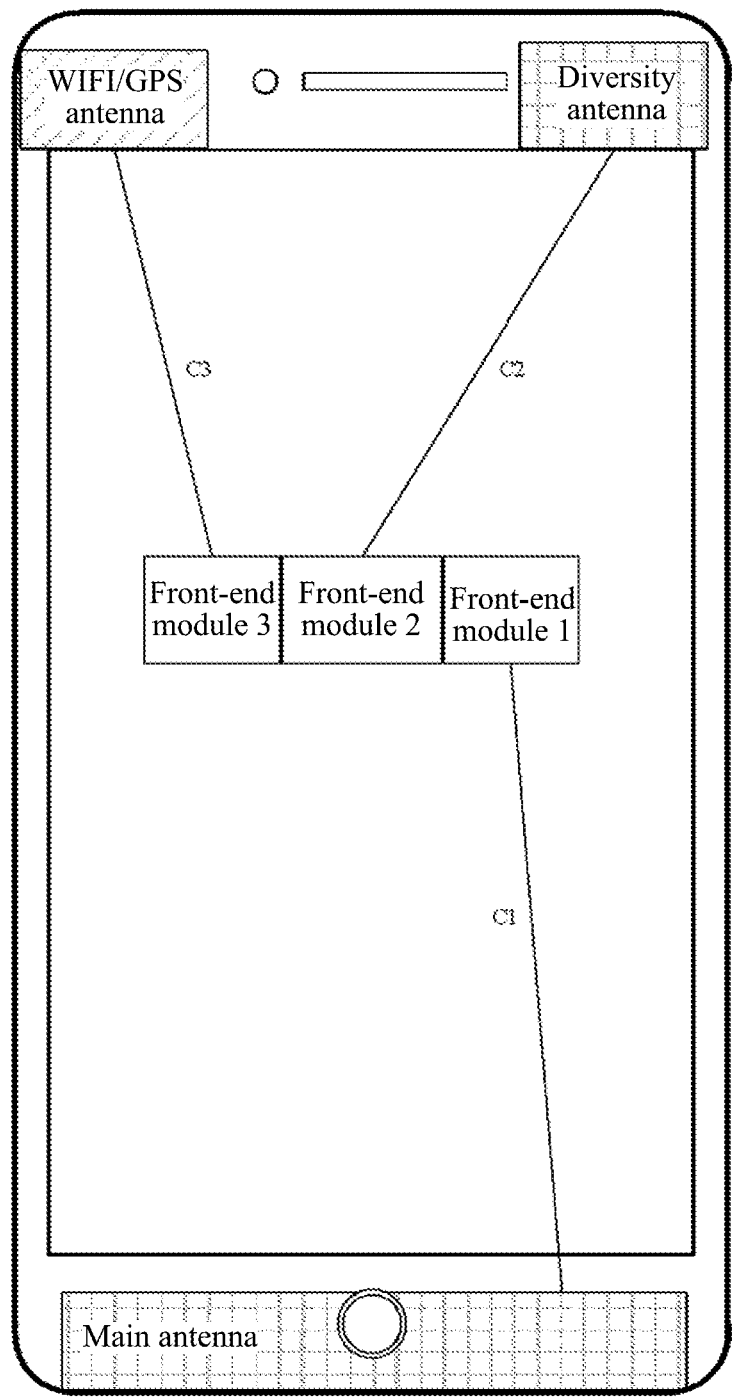
FIG. 1 is a schematic diagram of an adaptive antenna switching method according to the prior art provided in an embodiment of the present disclosure.

As shown in FIG. 1, in the prior art, an intelligent terminal mainly includes three parts: a primary antenna, a diversity antenna, and a Wireless Fidelity (WIFI)/Global Positioning System (GPS) antenna. Generally, a front-end module 1 is connected to the primary antenna through a physical link C1, a front-end module 2 is connected to the diversity antenna through a physical link C2, and a front-end module 3 is connected to the WIFI/GPS antenna through a physical link C3. Each antenna corresponds to a front-end module in a one-to-one manner. Optionally, the front-end modules may also correspond to the antennas in other manners. For example, multiple front-end modules correspond to one antenna module. For example, 2G/3G/4G modules for cellular communications correspond to the same antenna module. Alternatively, one front-end module corresponds to multiple antenna modules. For example, a LTE (Long Term Evolution in a universal mobile telecommunications technology) module corresponds to one or more of a high-frequency antenna module, a low-frequency antenna module, and a medium-frequency antenna module.

An architectural design of a radio frequency circuit is employed in the existing solution to resolve a conflict between a requirement for multiple antennas and isolation among multiple antennas of an intelligent terminal.

Figure 2:
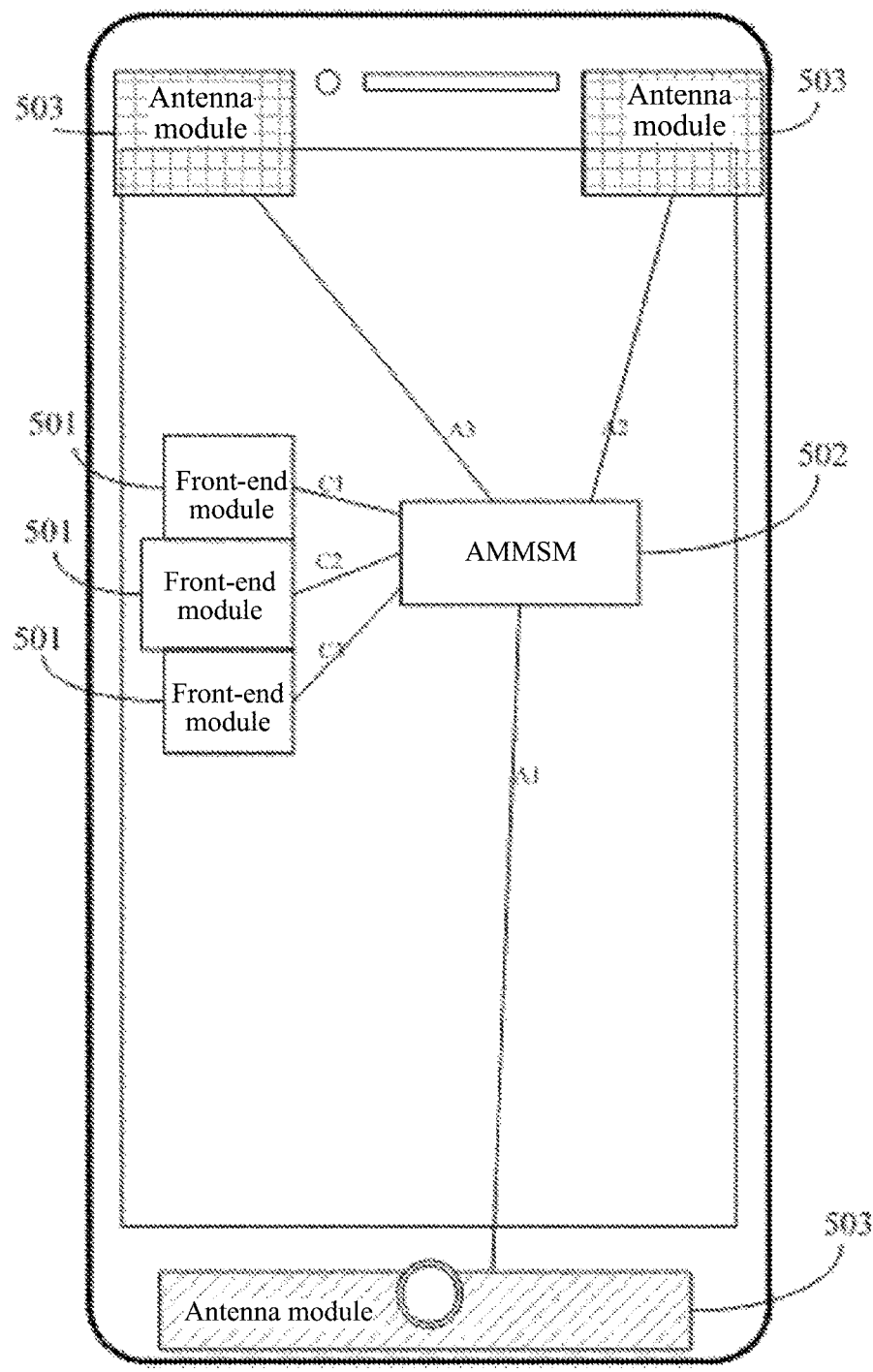
FIG. 2 is a schematic diagram of an adaptive antenna switching system according to an embodiment of the present disclosure.

As shown in FIG. 2, the present disclosure discloses an intelligent terminal provided with an adaptive antenna switching system, the intelligent terminal includes: a plurality of front-end modules 501, a plurality of antenna modules 503 and an antenna matrix management switch module (AMMSM) 502 electrically connected to the plurality of front-end modules and the plurality of antenna modules.

In the present disclosure, the plurality of front-end modules 501 of the intelligent terminal in the present disclosure are functional modules with different application functions in the intelligent terminal, such as, a call module, a data access module, a WIFI communications module, a GPS positioning module, and the like. The present disclosure includes multiple antenna modules having the same or different performance, and the average strengths of all the antenna modules may be different in the same period.

In the present disclosure, in order to ensure the freedom degree of the antenna module switching, it is first determined that each antenna module of the intelligent terminal could meet an index standard of an Over-the Air Technology for each front-end module, so that adaptive switching of the antenna modules may be achieved effectively.

Embodiment 1

Figure 3:
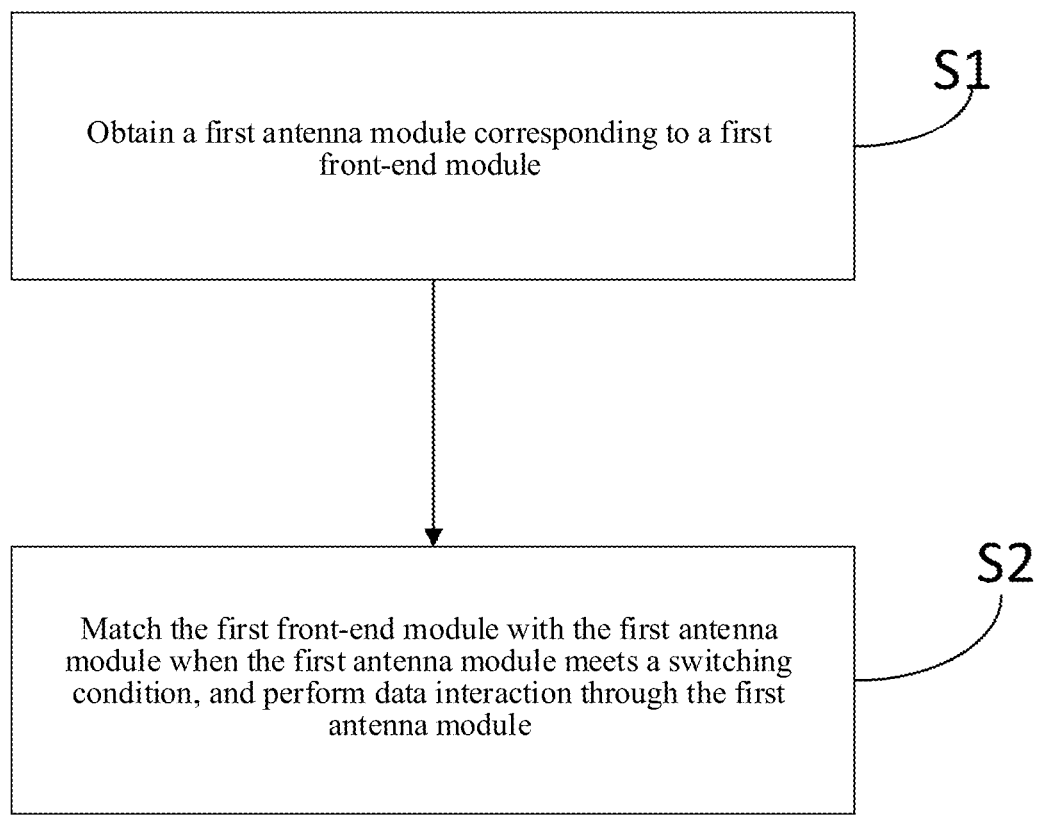
FIG. 3 is a schematic flowchart of an adaptive antenna switching method according to an embodiment of the present disclosure.

FIG. 3 shows an adaptive antenna switching method. The method is applied to an adaptive antenna switching system. The system may be provided on an intelligent terminal such as a smart phone, a tablet computer, a wearable device, or the like. The method includes the following steps:

At S1, obtaining a first antenna module corresponding to a first front-end module.

At S2, matching the first front-end module with the first antenna module when the first antenna module meets a switching condition, and perform data interaction through the first antenna module.

The first front-end module is a front-end module selected from a first set according to a first selection rule; the first antenna module is an antenna module selected from a second set according to a second selection rule; the first set is a set of all front-end modules; and the second set is a set of all antenna modules.

In this embodiment, the first selection rule is set for selecting a front-end module with the highest priority currently according to a priority order for front-end modules; and the second selection rule is set for selecting an antenna module with the highest priority currently according to a priority order for antenna module.

The adaptive antenna switching method according to Embodiment 1 of the present disclosure is disclosed as above. Through this implementation, a first front-end module and a first antenna module currently used by a user are determined according to a state of the scene used by the user; moreover, when a switching condition is met, matching between the first front-end module and the first antenna module is implemented, and data interaction is performed through the first antenna module. With the foregoing technical solution, the embodiment enables the intelligent terminal to adaptively switch the antenna in real time according to a current scene used by the user without increasing the number of antennas of the intelligent terminal, thereby ensuring that the antenna module for the first front-end module used by the user has optimal performance and thus greatly improving an experience effect for the user.

Embodiment 1 above provides a solution in which one front-end module matches with one antenna module and data interaction is finally completed. It is conceivable that, when there are a plurality of front-end modules and a plurality of antenna modules in the system, and after a front-end module ranked first and selected according to the first selection rule (that is, the foregoing first antenna module) is successfully matched with an antenna module ranked first and selected according to the second selection rule (that is, the foregoing first antenna module), it is also necessary to match other front-end modules with other antenna modules one by one, and a matching mechanism thereof is similar to that of the foregoing first antenna module and first antenna module. Descriptions are made below for Embodiment 2.

Embodiment 2

Figure 4:
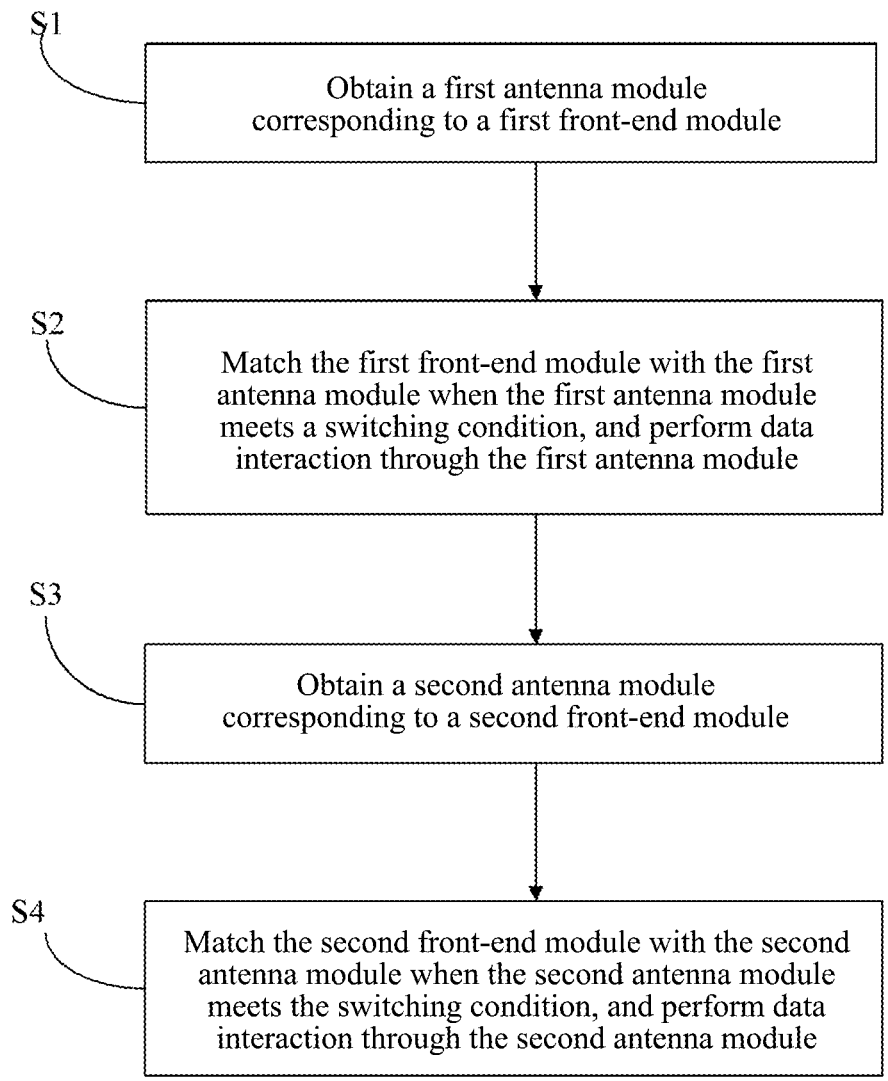
FIG. 4 is a schematic flowchart of another adaptive antenna switching method according to an embodiment of the present disclosure.

FIG. 4 shows an adaptive antenna switching method. The method is applied to an adaptive antenna switching system, which includes the following steps:

At S1, obtaining a first antenna module corresponding to a first front-end module.

At S2, matching the first front-end module with the first antenna module when the first antenna module meets a switching condition, and perform data interaction through the first antenna module.

The first front-end module is a front-end module selected from a first set according to a first selection rule; the first antenna module is an antenna module selected from a second set according to a second selection rule. The first set is a set of all front-end modules; and the second set is a set of all antenna modules. The first selection rule is used for selecting a front-end module with the highest priority currently according to a priority order for front-end modules; and the second selection rule is used for selecting an antenna module with the highest priority currently according to a priority order for antenna module.

At S3, obtaining a second antenna module corresponding to a second front-end module.

At S4, matching the second front-end module with the second antenna module when the second antenna module meets the switching condition, and perform data interaction through the second antenna module.

The second front-end module is a front-end module selected from a third set according to the first selection rule; the second antenna module is an antenna module selected from a fourth set according to the second selection rule; the third set is a set comprising all unmatched front-end modules in the first set; and the fourth set is a set comprising all unmatched antenna modules in the second set.

Steps S3 and S4 are performed repeatedly until all the front-end modules in the intelligent terminal are matched with corresponding antenna modules.

It should be noted that, at any moment, the antenna modules have to be sorted according to performance thereof and the front-end modules have to be sorted according to the priorities thereof. Therefore, there may be a sequential logical order between step S2 and step S3, or step S2 and step S3 may be performed simultaneously, which is not limited herein.

The adaptive antenna switching method according to Embodiment 2 of the present disclosure is described as above. In the method, a first front-end module currently used by a user and a first antenna module are determined according to the state of the scene used by the user; moreover, when a switching condition is met, matching of the first front-end module with the first antenna module is implemented, and data interaction is performed through the first antenna module. Then, matching of front-end modules and antenna modules other than the first front-end module and the first antenna module is performed, which comprises: firstly, a front-end module with the highest priority currently and an antenna module with the highest priority currently are determined; secondly, when a switching condition is met, matching of the front-end module having the highest priority currently with the antenna module having the highest priority currently is performed; finally, matching communication between all currently used front-end modules and corresponding antenna modules is performed. In this embodiment, after priorities of all the front-end modules and all the antenna modules are sorted, one or more front-end modules are enabled to match and communicate with corresponding antenna modules when meeting the switching condition. Overall power consumption of the intelligent terminal is not greatly affected while usage satisfaction of the user is ensured, and the utilization of each antenna module is maximized.

Embodiment 1 and Embodiment 2 provide an implementation for completing matching between front-end modules and antenna modules. It should be noted that, there is a possibility that the front-end module has matched an antenna module and thus performs data interaction through the antenna module, before matching the front-end module with an optimal antenna module. In this case, it is necessary to determine whether the antenna module currently used by the front-end module is the optimal antenna module among all antenna modules that could match the front-end module. Therefore, Embodiment 3 below provides a possible implementation.

Embodiment 3

Figure 5:
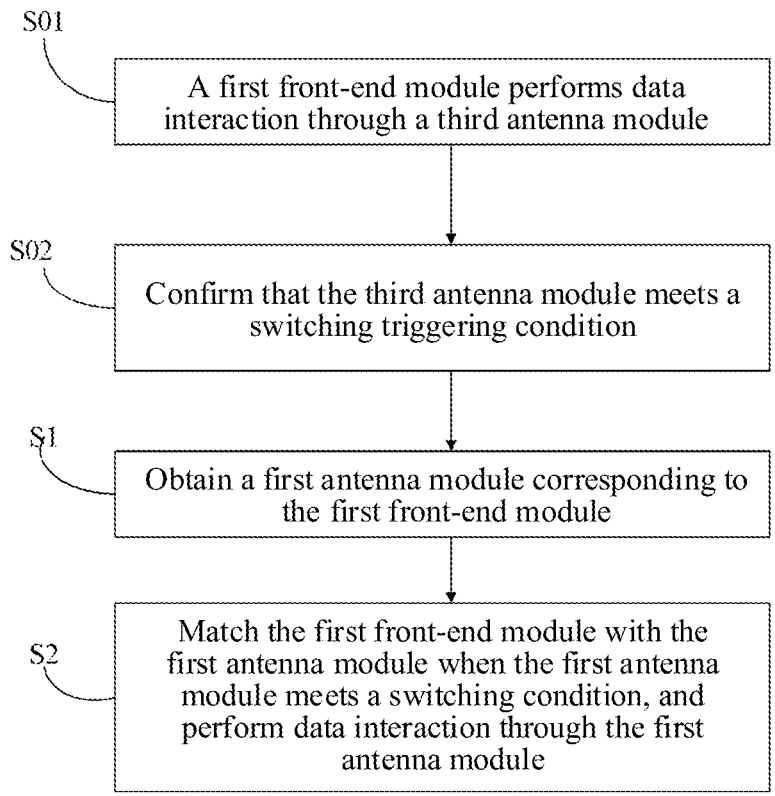
FIG. 5 is a schematic flowchart of another adaptive antenna switching method according to an embodiment of the present disclosure.

FIG. 5 shows an adaptive antenna switching method. The method is applied to an adaptive antenna switching system, which includes:

At S01, a first front-end module performs data interaction through a third antenna module.

The first front-end module is a front-end module selected from a first set according to a first selection rule; the first set is a set of all the front-end modules. The first selection rule is used for selecting a front-end module with the highest priority currently according to a priority order for front-end modules; the third antenna module is an antenna module currently used by the first front-end module.

For the formulation of the first selection rule in the foregoing embodiment, the following provides two possible solutions:

In solution A1, the first selection rule specifically includes:

Firstly, a currently used front-end module among all the front-end modules is determined.

Specifically, there are various manners for determining if a front-end module is in an "in use" state. For example, in a first manner, a front-end module currently displayed on a screen is labeled as "in use". Alternatively, a front-end module directly associated with a application interface currently displayed is labeled as "in use". In a second manner, data transmission requirements of all front-end modules are obtained, and a front-end module with a requirement greater than a particular threshold is labeled as "in use". In a third manner, all front-end modules currently executed in the background of the intelligent terminal are labeled as "in use" front-end modules.

Secondly, a priority of the currently used front-end module is set to be the highest in the priority order for front-end modules.

Specifically, if there are multiple currently used front-end modules at the same time, the priority order of the currently used front-end modules has to be further determined. A possible implementation is provided herein: the priority order is determined according to a preset priority order. For example, a priority order for the front-end modules used at the same time is pre-set as: call module>WIFI communication module>data access module>GPS positioning module. Thus, when the call module, the WIFI communication module, the data access module, and the GPS positioning module are used at the same time, the call module is firstly matched with an optimal antenna module by using the method in the foregoing embodiment, then the WIFI communication module is matched with an optimal antenna module, and all the currently used front-end modules are matched with optimal antenna modules according to the preset priority order.

It should be noted that, there are many possible ways for the pre-setting. In a first manner, factory pre-settings are used, where the priority order for all the front-end modules has been preset before the intelligent terminal leaves the factory. In a second manner, a user may set the priority order manually; such as, the user may reset the priority order of all the front-end modules according to a specific usage environment or habit, when the user is unsatisfied with or does not adaptive with the priority order for all the front-end modules preset before the intelligent terminal leaves the factory, due to a specific usage environment or habit. In this case, a front-end module with the highest priority among all the front-end modules currently used could be determined according to the priorities set by the user.

For example, when the user stays in a WIFI environment for a long time and he/she frequently uses a WIFI module to make a data call, the user may set the priorities of the front-end modules as follows: WIFI communication module>call module>data access module>GPS positioning module.

Optionally, in different usage scenes, the foregoing pre-set priorities may be altered according to usage policies of the different scenes. For example, a low-speed movement scene and a high-speed movement scene may be defined according to a movement speed of the intelligent terminal. In the low-speed movement scene, the priorities are pre-set as follows: WIFI communication module>data access module>call module>GPS positioning module; in the high-speed scene, the priorities are pre-set as follows: call module>data access module>WIFI communication module>GPS positioning module. This embodiment includes, but is not limited to, the intelligent terminal being used in scene modes, such as a tunnel mode, and a rain/snow mode. The state of each antenna module can be detected and determined in real time, and can be recorded accordingly. A user can switch and adjust the antenna modules and the front-end modules according system pre-setting or manually, thereby improving user experience.

In brief, although there are a plurality of multiple usage scenes for the intelligent terminal, priorities of a plurality of front-end modules of the intelligent terminal are sorted in real time by using a corresponding front-end module priority rule in each usage scene.

For example, when the user is in a WIFI environment for a long time and he/she frequently uses a WIFI module to make a data call, the user may set the priorities of the front-end modules as follows: WIFI communication module>call module>data access module>GPS positioning module.

In solution A2, the first selection rule specifically includes:

Firstly, a start time for current usage of each front-end module is obtained.

The start time for current usage in this solution is a time point when any front-end module currently running in the background of the intelligent terminal starts to run initially.

Secondly, a priority order for front-end modules is sorted in ascending order according to a chronological order of the start time for current usage of respective front-end modules.

For example, when the chronological order for the start time for current usage of a WIFI communication module, a data access module, and a GPS positioning module currently used by the user is: data access module, WIFI communication module, and GPS positioning module, the priority order for front-end modules is: data access module<WIFI communication module<GPS positioning module.

In addition, in this solution, if it is determined that the start time for current usage of two or more front-end modules in the background of the intelligent terminal are the same, a front-end module with the highest priority among all the currently used front-end modules is determined according to the priorities of all the front-end modules preset before the intelligent terminal leaves the factory.

Figure 6:
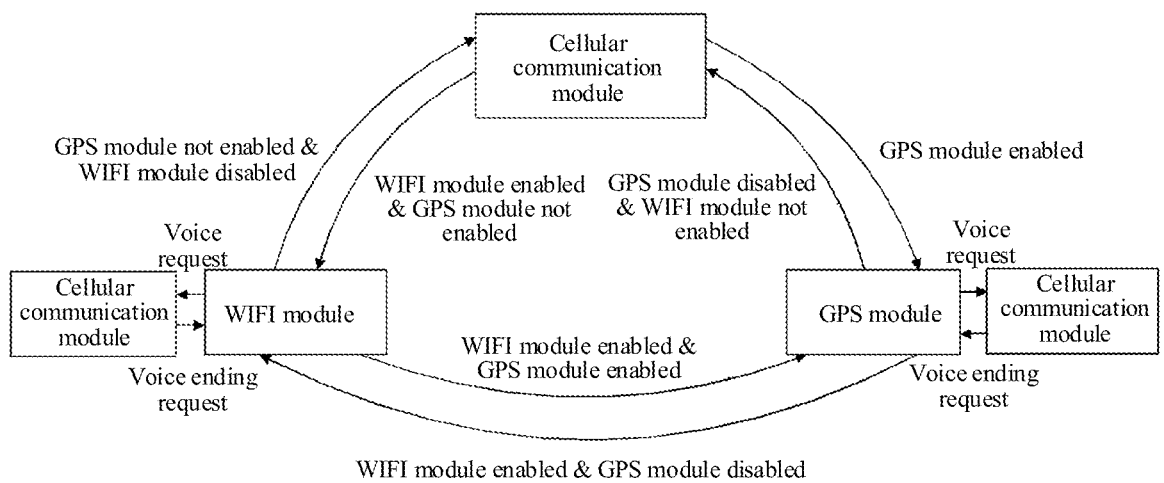
FIG. 6 is a schematic diagram of another adaptive antenna switching method according to an embodiment of the present disclosure.

FIG. 6 is a diagram of determining a state of a front-end module with the highest priority. In a cellular (2G/3G/4G) mode, if the user enables the GPS module, the GPS module is switched to be the module with the highest priority currently; if the GPS module is disabled and the WIFI module is enabled (the WIFI module being enabled refers to that a data connection is achieved), the WIFI module is switched to be the module with the highest priority currently; if the GPS module is disabled and the WIFI module is disabled, the cellular communication module is switched to be the module with the highest priority currently in the system. In the cellular (2G/3G/4G) mode, if the user enables the WIFI module but does not enable the GPS module, the WIFI module is switched to be the module with the highest priority currently; if the GPS module is enabled, the GPS module is switched to be the module with the highest priority; if the GPS module is disabled and the WIFI module is disabled, the cellular communication module is switched to be the module with the highest priority currently in the system; and when the WIFI module or the GPS module is used as the module with the highest priority in the current system, once there is a voice call request (voice request), the cellular communication module is switched to be the module with the highest priority currently in the current system, and when the voice call request is finished, the WIFI module or the GPS module is adaptively switched to be the module with the highest priority.

Referring to FIG. 5, confirming that the third antenna module meets a switching triggering condition specifically includes the following steps:

At S02.1, determining, within a sampling cycle, if a receiving signal strength value of the third antenna module exceeds a receiving signal strength threshold for antenna or whether a transmission power value of the third antenna module exceeds transmission power threshold for antenna.

At S02.2, confirming that the third antenna module meets the switching triggering condition if the receiving signal strength value of the third antenna module exceeds the receiving signal strength threshold for antenna or if the transmission power value of the third antenna module exceeds the transmission power threshold for antenna.

In this embodiment, steps S01 and S02 are used for determining if the antenna module currently used by the first front-end module needs to be switched, and the first front-end module would be matched with a new antenna module only when the condition in steps S02.1 and S02.2 is met. Steps S01 and S02 could ensure correct re-matching of the front-end module with a new antenna module.

Optionally, for S2 in the foregoing embodiment, the following provides a possible implementation for determining whether the first antenna module meets the switching condition:

At S2.1A, determining if a power difference value between the first antenna module and the third antenna module is greater than or equal to a power difference threshold.

If the power difference value between the first antenna module and the third antenna module is less than the power difference threshold, the first front-end module does not meet the switching triggering condition, and the first antenna module continues data interaction with the third antenna module, and the operation is ended.

At S2.2A, determining if an estimated switching time of the first antenna module is less than a cycle threshold, if the power difference value between the first antenna module and the third antenna module is greater than or equal to the power difference threshold.

The purpose of steps S2.1A and S2.2A is to avoid excessively frequent switching of the antenna module.

At S2.3, confirming that the first antenna module meets a switching condition, if the estimated switching time of the first antenna module is less than the cycle threshold, matching the first front-end module with the first antenna module, and performing data interaction through the first antenna module.

Specifically, a possible implementation of the second selection rule in the foregoing embodiment is as follows:

A priority order for antenna modules are formed by sorting priorities the antenna modules in descending order according to average strength values of all the antenna modules within a sampling cycle.

The average strength value of each antenna module is specifically calculated as follows:

$$I_{vi} = \frac{avgRSSI_i - avgTX_i}{2},$$

where $avgRSSI_i$ is an average receiving signal strength value of an $i^{th}$ antenna module within the sampling cycle, $avgTX_i$ is an average transmission power value of the $i^{th}$ antenna module within the sampling cycle, wherein i=1, 2 . . . .

In this embodiment, steps S2.1A and S2.2A are specifically described as follows:

the power difference between the first antenna module and the third antenna module is calculated specifically as follows:

$$\Delta \frac{avgRSSI - avgTX}{2} = \frac{avgRSSI_{optim} - avgTX_{optim}}{2} - \frac{avgRSSI_{former} - avgTX_{former}}{2};$$

$avgRSSI_{optim}$ is an average receiving signal strength value of the first antenna module within a sampling cycle, and $avgTX_{optim}$ is an average transmission power value of the first antenna module within the sampling cycle; and $avgRSSI_{former}$ is an average receiving signal strength value of the third antenna module within the sampling cycle, and $avgTX_{former}$ is an average transmission power value of the third antenna module within the sampling cycle.

The average strength value of each antenna module is specifically as follows:

Determining if the estimated switching time of the first antenna module is less than the cycle threshold when $$\Delta \frac{avgRSSI - avgTX}{2}$$

is greater than or equal to the power difference threshold, where the estimated switching time T1 is:

$$T1 = \Delta \frac{avgRSSI - avgTX}{2} \cdot bwt,$$

where bwt represents an antenna residence time.

If the estimated switching time of the first antenna module is greater than or equal to the cycle threshold, the first front-end module does not meet the switching triggering condition, and the first antenna module continues the data interaction with the third antenna module, and the operation is ended.

In the present disclosure, T1 is a detection switching cycle of the intelligent terminal, which is a relatively constant time value. Apparently, bwt increases as $$\Delta \frac{avgRSSI - avgTX}{2}$$

decreases, after the intelligent terminal determines the detection switching cycle.

In this embodiment, the following solution may also be employed to avoid excessively frequent switching of the antenna module:

At S2.1B, determining if a receiving power level difference value between the first antenna module and the third antenna module is greater than or equal to a receiving power level difference threshold.

When the receiving power level difference value between the first antenna module and the third antenna module is less than the receiving power level difference threshold, the first front-end module does not meet the switching triggering condition, and the first antenna module continues the data interaction with the third antenna module, and the operation is ended.

At S2.2B, determining if an estimated switching time of the first antenna module is less than a cycle threshold if the receiving power level difference value between the first antenna module and the third antenna module is greater than or equal to the receiving power level difference threshold. The determining rule in this step is exactly the same as the determining rule in S2.2A.

If the estimated switching time of the first antenna module is greater than or equal to the cycle threshold, the first front-end module does not meet the switching triggering condition, and the first antenna module continues the data interaction with the third antenna module, and the operation is ended.

At S2.3, confirming that the first antenna module meets a switching condition if the estimated switching time of the first antenna module is less than the cycle threshold, matching the first front-end module with the first antenna module, and performing data interaction through the first antenna module.

Figure 7:
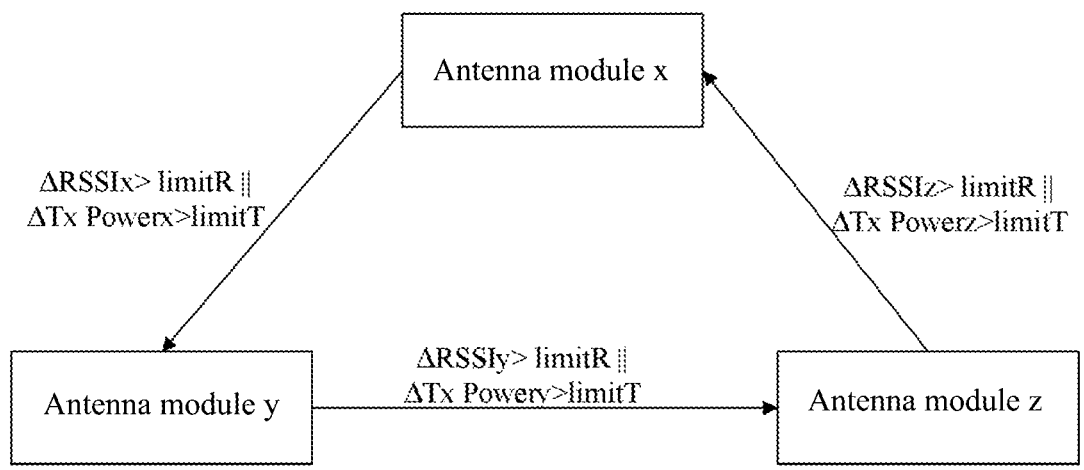
FIG. 7 is a schematic diagram of an adaptive antenna switching method according to an embodiment of the present disclosure.

A switching mechanism for three antenna modules is described in the following by means of a specific embodiment. As shown in FIG. 7, within the sampling cycle, if $\Delta$RSSI of the third antenna module is greater than limitR ($\Delta$RSSI is the strength value of the receiving signal of the third antenna module, and limitR is the strength threshold of antenna received signals) or if $\Delta$TxPower of the third antenna module is greater than limitT ($\Delta$TxPower is the transmission power value of the third antenna module, and limitT is the transmission power threshold for antenna), the switching triggering condition is met. According to FIG. 7, when the third antenna module is an antenna module x and $\Delta$ RSSIx>limitR or $\Delta$TxPowerx>limitT is satisfied, the switching triggering condition is met, switching to an antenna module y is performed, that is, the antenna module y is the first antenna module described above. Similarly, when the third antenna module is the antenna module y and the switching triggering condition is met, switching to an antenna module z is performed, that is, the antenna module z is the first antenna module described above; when the third antenna module is the antenna module z and the switching triggering condition is met, switching to the antenna module x is performed, that is, the antenna module x is the first antenna module described above.

The switching condition in the foregoing embodiment is actually measured from two dimensions: strength of the receiving signal and transmission power; where avgRSSI represents a receiving performance index of the antenna module, and avgTX represents a transmitting performance index of the antenna module, where $$\Delta I_{vi} = \Delta \frac{avgRSSI - avgTX}{2} =$$
$$\frac{avgRSSI_{optim} - avgTX_{optim}}{2} - \frac{avgRSSI_{former} - avgTX_{former}}{2}$$

For a switching threshold of the receiving, switching of the antenna module is started when $\Delta$avgRSSI=avgRSSI (in the current sampling cycle)−avgRSSI (in previous sampling cycle) is greater than the switching threshold. For a switching threshold of transmitting, switching of the antenna module is started when $\Delta$avgTX=avgTX (in the current sampling cycle)−avgTX (in previous sampling cycle) is greater than the switching threshold. This corresponds to FIG. 7. Obviously, the current antenna module state is definitely the optimal first antenna. In fact, it is detected in real time whether antenna performance exceeds a preset threshold, and switching to an antenna with better performance is performed if the antenna performance exceeds the preset threshold.

This embodiment provides an implementation of switching three antenna modules in a particular order. Definitely, the present disclosure also provides an antenna switchback mechanism, which will be specifically described with reference to the following embodiment.

Figure 8:
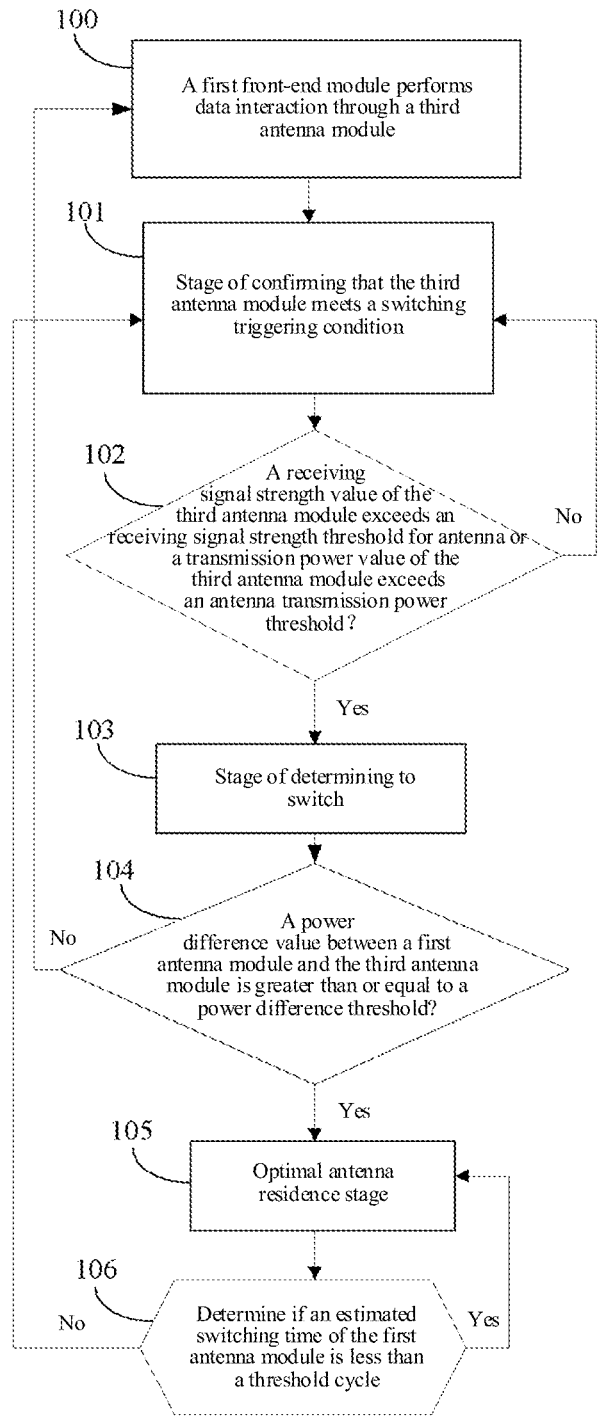
FIG. 8 is a schematic flowchart of an adaptive antenna switching method according to an embodiment of the present disclosure.

As shown in FIG. 8, an adaptive antenna switching method according to this embodiment specifically includes the following steps:

At Step 100, the first front-end module performs data interaction through a third antenna module.

At Step 101, confirming that the third antenna module meets a switching triggering condition.

At Step 102, determining if a receiving signal strength value of the third antenna module exceeds an receiving signal strength threshold for antenna or whether a transmission power value of the third antenna module exceeds transmission power threshold for antenna; step 103 is performed when one of the two conditions is met; otherwise, return to step 101.

At Step 103, determining to switch the antenna module.

At Step 104, determining if a power difference value between a first antenna module and the third antenna module is greater than or equal to a power difference threshold; and performing step 105 when the condition is met; otherwise, returning to step 100.

Optionally, step 104 may also be implemented by determining whether a receiving power level difference value between the first antenna module and the third antenna module is greater than or equal to a receiving power level difference threshold. Further, when the condition in step 104 is not met, the process returns to step 100. An antenna switchback mechanism is provided herein. By using FIG. 7 as an example, if the third antenna module is an antenna module x, and the first antenna module is an antenna module y, when the process proceeds to step 104 and the condition in step 104 is not met, the corresponding front-end module may be switched back to the antenna module x, to continue to transmit data by using the antenna module x.

At Step 105, proceeding to an optimal antenna residence stage.

At Step 106, determining whether an estimated switching time of the first antenna module is less than a cycle threshold; performing step 105 when the estimated switching time of the first antenna module is less than the cycle threshold; otherwise, returning to step 101.

Described above is an adaptive antenna switching method according to this embodiment. In the method, firstly, a front-end module with the highest priority is determined as the first front-end module by using the first selection rule; secondly, an antenna module with the highest priority is determined as the first antenna module by using the second selection rule, and it is determined whether the first front-end module needs to be switched to communicate through the first antenna module; finally, when it is determined that switching is required, matching communication with the first antenna module is performed, thereby improving the stability and reliability of the communication. This embodiment discloses rules for sorting priorities of front-end modules and antenna modules, which improves the reliability and stability of antenna module switching, thereby avoiding frequent invalid switching and ensuring a matching communication between an optimal antenna module and an optimal front-end module to be implemented rapidly when one antenna module is obviously superior to another antenna module (which, for example, would be affected by blocking or affected by multipath fading).

Embodiment 4

As shown in FIG. 2, an adaptive antenna switching system is provided. The system is configured to perform the adaptive antenna switching method of the intelligent terminal provided in the foregoing embodiments. The system includes: at least three front-end modules 501 with different application functions, at least three antenna modules 503, and an antenna matrix management switch module 502.

To implement real-time adaptive switching of each antenna module, the at least three front-end modules 501 with different application functions are all connected to the antenna matrix management switch module 502, and the antenna matrix management switch module 502 is also connected to each of the at least three antenna modules 503.

A specific operating of the adaptive antenna switching system disclosed in this embodiment is described as follows:

The antenna matrix management switch module 502 is configured to obtain a first antenna module corresponding to a first front-end module.

When the first antenna module meets a switching condition, the antenna matrix management switch module 502 controls the first front-end module and the first antenna module to match each other and perform data interaction through the first antenna module.

The first front-end module is a front-end module selected from a first set according to a first selection rule; the first antenna module is an antenna module selected from a second set according to a second selection rule; the first set is a set of all front-end modules; the second set is a set of all antenna modules; the first selection rule is used for selecting a front-end module with the highest priority currently according to a priority order for front-end modules; and the second selection rule is used for selecting an antenna module with the highest priority currently according to a priority order for antenna modules.

Described above is an adaptive antenna switching system according to Embodiment 4 of the present disclosure. Through this implementation, the system includes: at least three front-end modules with different application functions, at least three antenna modules, and an antenna matrix management switch module. The antenna matrix management switch module calculates a first front-end module and a first antenna module currently used by a user according to a scene state currently used by the user; moreover, when a switching condition is met, matching between the first front-end module and the first antenna module is implemented, and data interaction is performed through the first antenna module. In this embodiment, under the circumstance that the number of antennas is not increased, the system disclosed in this embodiment has different front-end modules and different antenna modules. Moreover, the front-end modules and the antenna modules are all electrically connected to the AMMSM module, and the system determines a front-end module with the highest priority among currently used front-end modules according to a current usage requirement of the user, and the antenna module with the optimal performance currently is switched to adaptively in real time through the AMMSM. In fact, the AMMSM implements mapping of the front-end module and the antenna module from logic to a physical link, and the degree of freedom of an antenna of a wireless module is achieved. By using the foregoing technical solution, an intelligent terminal may adaptively switch an antenna in real time according to a current usage scene of a user, thereby ensuring that an antenna module of the first front-end module used by the user has optimal performance and greatly improving an experience for the user.

Embodiment 5

As shown in FIG. 2, the adaptive antenna switching system includes: at least three front-end modules 501 with different application functions, at least three antenna modules 503, and an antenna matrix management switch module 502.

To implement real-time adaptive switching of each antenna module, the at least three front-end modules 501 with different application functions are all connected to the antenna matrix management switch module 502, and the antenna matrix management switch module 502 is also connected to the at least three antenna modules 503.

A specific operation of the adaptive antenna switching system disclosed in this embodiment is described as follows:

The antenna matrix management switch module 502 is configured to obtain a first antenna module corresponding to a first front-end module.

When the first antenna module meets a switching condition, the antenna matrix management switch module 502 controls the first front-end module and the first antenna module to match each other and perform data interaction through the first antenna module.

The first front-end module is a front-end module selected from a first set according to a first selection rule; the first antenna module is an antenna module selected from a second set according to a second selection rule; the first set is a set of all front-end modules; the second set is a set of all antenna modules; the first selection rule is set for selecting a front-end module with the highest priority currently according to a priority order for front-end modules; and the second selection rule is set for selecting an antenna module with the highest priority currently according to a priority order for antenna modules.

The antenna matrix management switch module is further configured to obtain a second antenna module corresponding to a second front-end module.

When the second antenna module meets the switching condition, the antenna matrix management switch module controls the second front-end module and the second antenna module to match each other and perform data interaction through the second antenna module.

The second front-end module is a front-end module selected from a third set according to the first selection rule; the second antenna module is an antenna module selected from a fourth set according to the second selection rule; the third set is a set of all unmatched front-end modules in the first set; and the fourth set is a set of all unmatched antenna modules in the second set.

Described above is an adaptive antenna switching system according to Embodiment 5 of the present disclosure. Through this implementation, the system includes: at least three front-end modules with different application functions, at least three antenna modules, and an antenna matrix management switch module. The antenna matrix management switch module determines a first front-end module currently used by a user and a first antenna module according to a state of the current usage scene of the user; when a switching condition is met, matching of the first front-end module with the first antenna module is implemented, and data interaction is performed through the first antenna module. Then, the AMMSM further implements matching of other front-end modules with other antenna modules, except the first front-end module and the first antenna module, which comprises: firstly, a front-end module with the highest priority currently and an antenna module with the highest priority currently are calculated; secondly, when a switching condition is met, matching of the front-end module with the highest priority currently with the antenna module having the highest priority currently is implemented, where the antenna module having the highest priority currently may be considered as an antenna module having optimal-performance currently available. Finally, matching communication between all currently used front-end modules and corresponding antenna modules are implemented. In this embodiment, after priorities of all the front-end modules and all the antenna modules are sorted, one or more front-end modules meeting the switching condition are enabled to communicate with antenna modules corresponding thereto. Overall power consumption of the intelligent terminal is not greatly affected while usage satisfaction of the user is ensured, and thus the utilization of each antenna module is maximized.

Embodiment 6

As shown in FIG. 2, the adaptive antenna switching system includes: at least three front-end modules 501 with different application functions, at least three antenna modules 503, and an antenna matrix management switch module 502.

To implement real-time adaptive switching of each antenna module, the at least three front-end modules 501 with different application functions are all connected to the antenna matrix management switch module 502, and the antenna matrix management switch module 502 is also connected to each of the at least three antenna modules 503.

Figure 10:
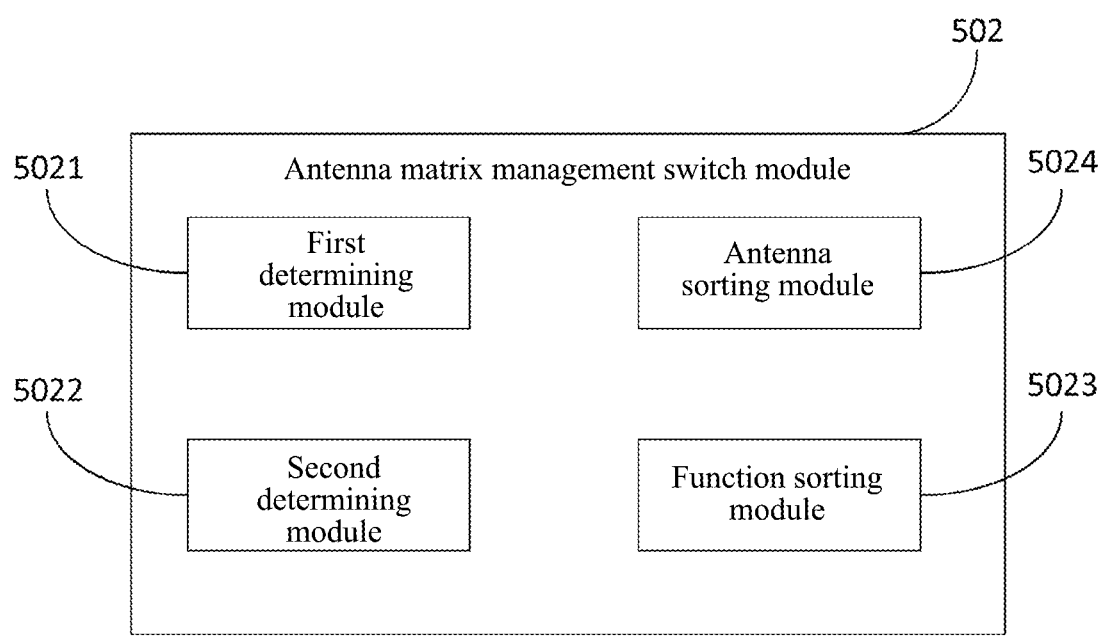
FIG. 10 is a schematic diagram of an embodiment of an antenna matrix management switch module for an adaptive antenna switching system according to the present disclosure.

Referring to FIG. 10, in this embodiment, the antenna matrix management switch module includes: a first determining module 5021, a second determining module 5022, a function sorting module 5023, and an antenna sorting module 5024.

A specific operation of the adaptive antenna switching system disclosed in this embodiment is described as follows:

The first front-end module performs data interaction through a third antenna module.

The first front-end module is a front-end module selected from a first set according to a first selection rule.

The first set is a set of all front-end modules; the first selection rule is set for selecting a front-end module with the highest priority currently according to a priority order for front-end modules; the third antenna module is an antenna module currently used by the first front-end module.

The function sorting module 5023 is configured to set the first selection rule. There are two preferred solutions for setting of the first selection rule as follows.

Solution A1:

The function sorting module 5023 firstly determines a currently used front-end module among all the front-end modules.

Specifically, there are various ways for the function sorting module 5023 to determine whether a front-end module is in an "in use" state. For example, in a first manner, the function sorting module 5023 may label a front-end module currently displayed on a screen as "in use". Alternatively, the function sorting module 5023 labels a front-end module directly associated with a currently displayed application interface as "in use". In a second manner, the function sorting module 5023 obtains data transmission requirements of all front-end modules, and labels a front-end module with a requirement greater than a particular threshold as "in use". In a third manner, the function sorting module 5023 labels all front-end modules currently executed in the background of the intelligent terminal as front-end modules "in use".

Specifically, there are various ways for determining that a front-end module is in an "in use" state. For example, in a first manner, a front-end module currently displayed on a screen is labeled as "in use". Alternatively, a front-end module directly associated with an application interface currently displayed is labeled as "in use". In a second manner, data transmission requirements of all front-end modules are obtained, and a front-end module with a requirement greater than a particular threshold is labeled as "in use". In a third manner, all front-end modules currently executed in the background of the intelligent terminal are labeled as "in use" front-end modules.

Secondly, the function sorting module 5023 sets the priority of the currently used front-end module to be the highest in the priority order for front-end module.

Specifically, if there are multiple currently used front-end modules at the same time, the function sorting module 5023 has to further determine the priority order for the currently used front-end modules. A possible implementation is provided herein: the function sorting module 5023 determines the priority order according to a preset priority order. For example, a priority order for front-end modules used at the same time is pre-set as: call module>WIFI communication module>data access module>GPS positioning module. Thus, when the call module, the WIFI communication module, the data access module, and the GPS positioning module are used at the same time, the function sorting module 5023 firstly matches the call module with an optimal antenna module by using the method in the foregoing embodiment, then matches the WIFI communication module with an optimal antenna module, and matches all the currently used front-end modules with optimal antenna modules according to the preset priority order.

It should be noted that, there are many possible ways for the pre-setting. In a first manner, factory pre-settings are used, where the function sorting module 5023 has preset the priority order for all the front-end modules before the intelligent terminal leaves the factory. In a second manner, a user may configure the function sorting module 5023 manually; such as, the user may reset the priority order for all the front-end modules according to the specific usage environment or habit, when the user is unsatisfied with or does not adaptive with the priority order for all the front-end modules preset before the intelligent terminal leaves the factory, due to a specific usage environment or habit. In this case, a front-end module with the highest priority among all the front-end modules currently used may be determined according to the priorities set by the user through the function sorting module 5023.

For example, when a user stays in a WIFI environment for a long time and he/she frequently uses a WIFI module to make a data call, the user may set the priorities of the front-end modules through the function sorting module 5023 as follows: WIFI communication module>call module>data access module>GPS positioning module.

Optionally, in different usage scenes, the foregoing pre-set priorities may be altered according to usage policies of the different scenes. For example, a low-speed movement scene and a high-speed movement scene may be defined according to a movement speed of the intelligent terminal. In the low-speed movement scene, the priorities are pre-set as follows: WIFI communication module>data access module>call module>GPS positioning module; in the high-speed scene, the priorities are pre-set as follows: call module>data access module>WIFI communication module>GPS positioning module. This embodiment includes, but is not limited to, the intelligent terminal being used in scene modes, such as a tunnel mode, and a rain/snow mode. the state of each antenna module can be detected and determined in real time, and can be recorded accordingly. A user can switch and adjust the antenna modules and the front-end modules according system pre-setting or manually, thereby improving user experience.

In brief, although there are a plurality of multiple usage scenes for the intelligent terminal, priorities of a plurality of front-end modules of the intelligent terminal are sorted in real time by using a corresponding front-end module priority rule in each of the usage scenes.

In solution B2, the first selection rule specifically includes:

Firstly, the function sorting module 5023 obtains a start time for current usage of each front-end module.

The start time for current usage in this solution is a time point when any front-end module currently running in the background of the intelligent terminal starts to run initially.

Secondly, the function sorting module 5023 sorts the priority order for front-end modules from low to high according to an order of the start time for current usage of each front-end module.

For example, when the order for the start time for current usage of a WIFI communication module, a data access module, and a GPS positioning module currently used by the user is: data access module, WIFI communication module, and GPS positioning module, the function sorting module 5023 sets the priority order for front-end modules as: data access module<WIFI communication module<GPS positioning module.

In addition, in this solution, if it is determined that the start time for current usage of two or more front-end modules in the background of the intelligent terminal are the same, the function sorting module 5023 determines the front-end module with the highest priority among all the currently used front-end modules according to the priorities of all the front-end modules preset before the intelligent terminal leaves the factory.

The first determining module 5021 confirming that the third antenna module meets a switching triggering condition specifically includes:

The first determining module 5021 determines if a power difference value between the first antenna module and the third antenna module is greater than or equal to a power difference threshold.

The operation of the first determining module 5021 is described specifically as follows:

The first determining module 5021 determines, within a sampling cycle, if a receiving signal strength value of the third antenna module exceeds a receiving signal strength threshold for antenna or whether a transmission power value of the third antenna module exceeds transmission power threshold for antenna.

The first determining module 5021 confirms that the third antenna module meets the switching triggering condition if the receiving signal strength value of the third antenna module exceeds the receiving signal strength threshold for antenna or the transmission power value of the third antenna module exceeds the transmission power threshold for antenna.

In this embodiment, when the receiving signal strength value of the third antenna module does not exceed the receiving signal strength threshold for antenna, and the transmission power value of the third antenna module does not exceed the transmission power threshold for antenna, the first determining module 5021 confirms that there is no need to switch the antenna module for the first front-end module, and the process is ended.

In this embodiment, the first determining module 5021 is configured to determine whether the antenna module currently used by the first front-end module needs to be switched, and the determining module could ensure correct re-matching of the front-end module with a new antenna module.

The antenna matrix management switch module is configured to obtain a first antenna module corresponding to the first front-end module.

When the first antenna module meets a switching condition, the antenna matrix management switch module controls the first front-end module and the first antenna module to match each other and performs data interaction through the first antenna module.

The first front-end module is a front-end module selected from a first set according to a first selection rule; the first set is a set of all front-end modules; the first selection rule is set for selecting a front-end module with the highest priority currently according to a priority order for front-end modules.

The first antenna module is an antenna module selected from a second set according to a second selection rule; the second set is a set of all antenna modules; the second selection rule is set for selecting an antenna module with the highest priority currently according to the priority order for antenna modules.

In this embodiment, the antenna sorting module 5024 sorts priorities in descending order according to average strength values of all the antenna modules within a sampling cycle, so as to form the priority order for antenna modules.

The average strength value of each antenna module is calculated specifically as follows:

$$I_{vi} = \frac{avgRSSI_i - avgTX_i}{2},$$

where $avgRSSI_i$ is an average receiving signal strength value of an $i^{th}$ antenna module within the sampling cycle, $avgTX_i$ is an average transmission power value of the $i^{th}$ antenna module within the sampling cycle, wherein i=1, 2 . . . .

The second determining module 5022 is mainly used for avoiding excessively frequent switching of the antenna module, and the following two solutions are included:

Solution C1:

The second determining module 5022 determines if a power difference value between the first antenna module and the third antenna module is greater than or equal to a power difference threshold:

the power difference between the first antenna module and the third antenna module is specifically calculated as follows:

$$\Delta \frac{avgRSSI - avgTX}{2} = \frac{avgRSSI_{optim} - avgTX_{optim}}{2} - \frac{avgRSSI_{former} - avgTX_{former}}{2};$$

avgRSSI$_{optim}$ where is an average receiving signal strength value of the first antenna module within a sampling cycle, and avgTX$_{optim}$ is an average transmission power value of the first antenna module within the sampling cycle; and avgRSSI$_{former}$ is an average receiving signal strength value of the third antenna module within the sampling cycle, and avgTX$_{former}$ is an average transmission power value of the third antenna module within the sampling cycle.

The second determining module 5022 determines if an estimated switching time of the first antenna module is less than a cycle threshold, if the power difference value between the first antenna module and the third antenna module is greater than or equal to the power difference threshold.

The foregoing operation specifically includes:

The second determining module 5022 determines if the estimated switching time of the first antenna module is less than the cycle threshold when $$\Delta \frac{avgRSSI - avgTX}{2}$$

is greater than or equal to the power difference threshold, where the estimated switching time T1 is:

$$T1 = \Delta \frac{avgRSSI - avgTX}{2} \cdot bwt,$$

bwt representing an antenna residence time.

In the present disclosure, T1 is a detection switching cycle of the intelligent terminal, which is a relatively constant time value. Apparently, bwt increases as $$\Delta \frac{avgRSSI - avgTX}{2}$$

decreases, after the intelligent terminal determines the detection switching cycle.

Solution C2:

When the estimated switching time of the first antenna module is greater than or equal to the cycle threshold, the first front-end module does not meet the switching triggering condition, the second determining module 5022 confirms that the first antenna module continues the data interaction with the third antenna module, and the operation is ended.

When the estimated switching time of the first antenna module is less than the cycle threshold, the second determining module 5022 confirms that the third antenna module meets the switching triggering condition.

In this embodiment, the following solution may also be employed to avoid excessively frequent switching of the antenna module:

The second determining module 5022 determines if a receiving power level difference value between the first antenna module and the third antenna module is greater than or equal to a receiving power level difference threshold.

When the receiving power level difference value between the first antenna module and the third antenna module is less than the receiving power level difference threshold, the second determining module 5022 confirms that the first front-end module does not meet the switching triggering condition, the first antenna module continues the data interaction with the third antenna module, and the operation is ended.

The second determining module 5022 determines if an estimated switching time of the first antenna module is less than a cycle threshold when the receiving power level difference value between the first antenna module and the third antenna module is greater than or equal to the receiving power level difference threshold. The determining rule in the solution C2 is exactly the same as the determining rule in the solution C1.

When the estimated switching time of the first antenna module is greater than or equal to the cycle threshold, the second determining module 5022 confirms that the first front-end module does not meet the switching triggering condition, the first antenna module continues the data interaction with the third antenna module, and the operation is ended.

Figure 9:
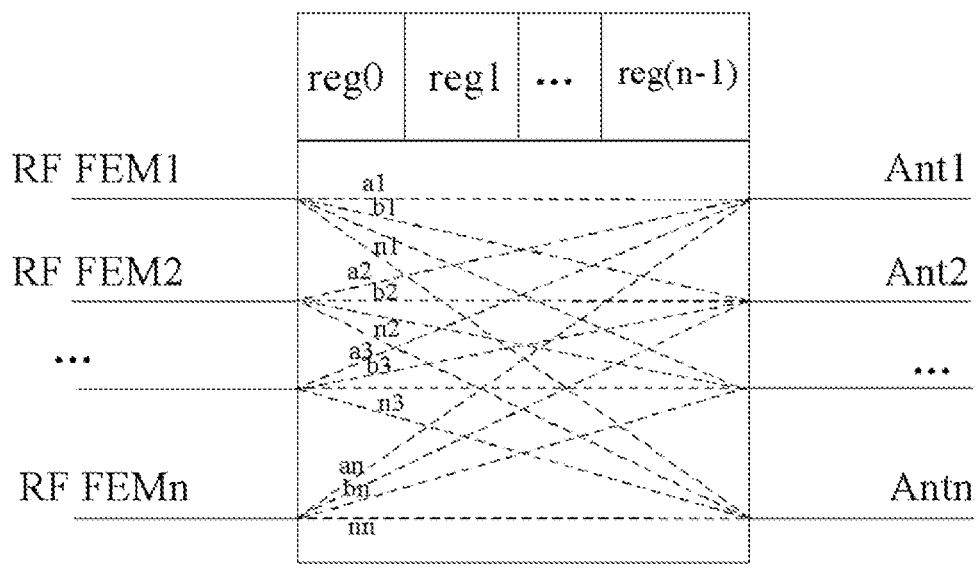
FIG. 9 is a schematic structural diagram of an antenna matrix management switch module for an adaptive antenna switching system according to the present disclosure.

FIG. 9 shows a specific structure for antenna matrix management switch module 502. Multiple front-end modules and multiple antenna modules are all connected to the antenna matrix management switch module 502 through a circuit. According to the foregoing technical solution, a front-end module with the highest priority is determined, and the antenna matrix management switch module 502 adaptively switches the front-end module with the highest priority to an antenna module with optimal performance currently, in real time.

A switch mapping matrix of [a1, b1 . . . , n1; a2, b2 . . . , n2; . . . ; an, bn . . . , nn] in FIG. 9 implements various connection relationships from a front-end module i (RFFEMi) (i=1 to n) to an antenna module j(Antj) (j=1~n); reg0, reg1 . . . , reg(n−1) are storage units for storing antenna performance states of Ant1, Ant2 . . . , Antn in real time, and the performance state of each antenna is tracked in real time.

Through the foregoing technical solution, a front-end module with the highest operating priority currently in an intelligent terminal is determined, an antenna with optimal performance is found from all the antenna modules (Ant1, Ant2 . . . , Antn) according to an adaptive antenna switching process, so as to perform antenna module switching, thereby ensuring that network experience of the user in practical use is effectively improved.

Described above is an adaptive antenna switching system according to this embodiment. First, the function sorting module 5023 determines a front-end module with the highest priority as a first front-end module according to a first selection rule; secondly, the antenna sorting module 5024 determines an antenna module with the highest priority as a first antenna module according to a second selection rule, and the first determining module 5021 determines if the first front-end module needs to be switched to communicate through the first antenna module; finally, when it is determined that switching is required, the second determining module 5022 controls the first front-end module to communicate with the first antenna module, thereby improving the stability and reliability of the communication. This embodiment discloses rules for sorting priorities of front-end modules and antenna modules, which improves the reliability and stability of antenna module switching, thereby avoiding frequently invalid switching and ensuring a matching communication between an optimal antenna module and an optimal front-end module to be implemented rapidly when one antenna module is obviously superior to another antenna module (which, for example, would be affected by blocking or affected by multipath fading).

Embodiment 7

Figure 11:
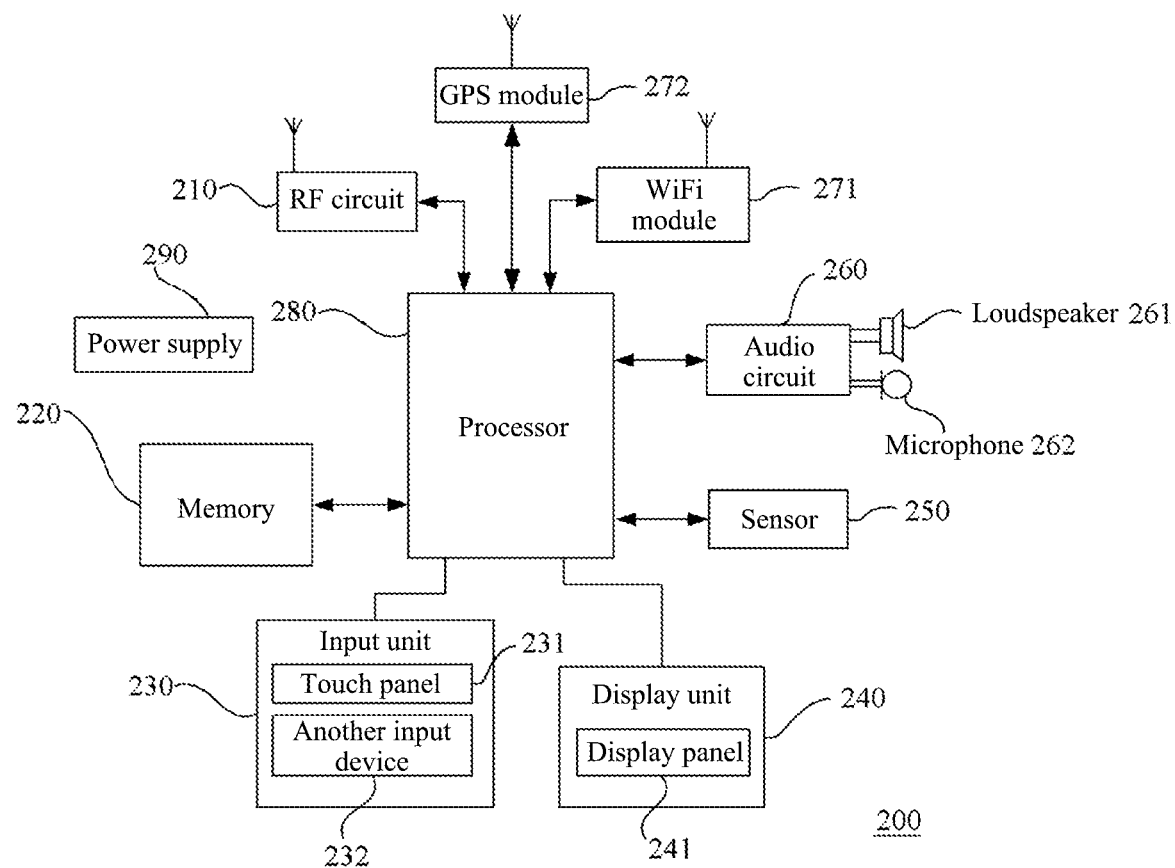
FIG. 11 is a schematic structural diagram of an intelligent terminal according to the present disclosure.

This embodiment can be used to perform the methods shown in Embodiments 1 and 2 of the present disclosure. FIG. 11 shows a structure of an intelligent terminal 200 provided in Embodiment 7 of the present disclosure. Functions of the adaptive antenna switching system in the foregoing embodiment may be implemented through the intelligent terminal.

The intelligent terminal may be a terminal device, including a mobile phone, a tablet computer, a personal digital assistant (PDA), a point of sales (POS), a vehicle-mounted computer, or the like. Taking a mobile phone as an example of intelligent terminal, and FIG. 11 is a block diagram of a partial structure of a mobile phone 200 related to the terminal provided in this embodiment of the present disclosure. Referring to FIG. 11, the mobile phone 200 includes components such as a radio frequency (RF) circuit 210, a memory 220, an input unit 230, a display unit 240, a sensor 250, an audio circuit 260, a WIFI module 270, a processor 280, and a power supply 290. A person skilled in the art can understand that, the mobile phone structure shown in FIG. 11 is merely an example of an implementation, which does not constitute a limitation to the mobile phone. The mobile phone may include more or fewer components than those shown in the figure, or some components may be combined, or a different component deployment may be used.

The following specifically describes each component of the mobile phone 200 with reference to FIG. 11.

The RF circuit 210 may be configured to receive and send a signal during an information receiving and sending process or a conversation process. Specifically, after receiving downlink information from a base station, the RF circuit 210 delivers the downlink information to the processors 280 for processing; in addition, the RF circuit 210 sends related uplink data to the base station. Generally, the RF circuit includes, but is not limited to, an antenna, at least one amplifier, a transceiver, a coupler, a low noise amplifier (LNA), and a duplexer. In addition, the RF circuit 510 may also communicate with a network and another device by wireless communication. The wireless communication may use any communication standard or protocol, which includes, but is not limited to, a Global System for Mobile Communications (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

In the above description, the primary antenna and the diversity antenna may implement the foregoing functions through the RF circuit 210.

The memory 220 may be configured to store a software program and module. The processor 280 runs the software program and module stored in the memory 220, so as to implement various functional applications and data processing of the mobile phone 200. The memory 220 may mainly include a program storage area and a data storage area. The program storage area may store an operating system, an application program required by at least one function (such as a sound playing function and an image displaying function), and the like. The data storage area may store data (such as audio data and an address book) created according to usage of the mobile phone 200, and the like. In addition, the memory 220 may include a high speed random access memory, and may also include a non-volatile memory, such as at least one magnetic disk storage device, a flash memory, or another volatile solid storage device.

The input unit 230 may be configured to receive input digit or character information, and generate a key signal input related to the user setting and function control. Specifically, the input unit 230 may include a touch panel 231 and another input device 232. The touch panel 231 (which may also be referred to as a touch screen) may collect a touch operation of a user on or near the touch panel (such as an operation of a user on or near the touch panel 231 by using any suitable object or attachment, such as a finger or a stylus), and drive a corresponding connection apparatus according to a preset program. Optionally, the touch panel 231 may include two parts: a touch detection apparatus and a touch controller. The touch detection apparatus detects a touch position of the user, detects a signal generated by the touch operation, and transmits the signal to the touch controller. The touch controller receives the touch information from the touch detection apparatus, converts the touch information into touch point coordinates, and sends the touch point coordinates to the processor 280. Moreover, the touch controller may receive and execute a command sent from the processor 280. In addition, the touch panel 231 may be implemented in various types, such as a resistive type, a capacitance type, an infrared type, and a surface acoustic wave type. In addition to the touch panel 231, the input unit 230 may further include the another input device 232. Specifically, the another input device 232 may include, but is not limited to, one or more of a physical keyboard, a functional key (such as a volume control key or a switch key), a track ball, a mouse, and a joystick.

The display unit 240 may be configured to display information input by the user or information provided to the user and various menus of the mobile phone 200. The display unit 240 may include a display panel 241. Optionally, the display panel 241 may be configured by using a liquid crystal display (LCD), an organic light-emitting diode (OLED), or the like. Further, the touch panel 231 may cover the display panel 241. After detecting a touch operation on or near the touch panel 231, the touch panel 231 transmits the touch operation to the processor 280, so as to determine a type of a touch event. Then, the processor 280 provides a corresponding visual output on the display panel 241 according to the type of the touch event. Although in FIG. 11, the touch panel 231 and the display panel 241 are used as two separate parts to implement input and output functions, the touch panel 231 and the display panel 241 may be integrated to implement the input and output functions of the mobile phone 200 in some embodiments.

The mobile phone 200 may further include at least one sensor 250, such as an optical sensor, a motion sensor, and other sensors. Specifically, the optical sensor may include an ambient light sensor and a proximity sensor. The ambient light sensor may adjust luminance of the display panel 241 according to brightness of the ambient light. The proximity sensor may switch off the display panel 241 and/or backlight when the mobile phone 200 is moved to the ear. As one type of motion sensor, a gravity acceleration sensor may detect magnitude of accelerations at various directions (generally in three axes), may detect magnitude and a direction of the gravity when static, and may be configured to identify an application of a mobile phone attitude (such as switchover between horizontal and vertical screens, a related game, and attitude calibration of a magnetometer), a related function of vibration identification (such as a pedometer and a knock). Other sensors (such as a gyroscope, a barometer, a hygrometer, a thermometer, and an infrared sensor) configured in the mobile phone 200 are not further described herein.

The audio circuit 260, a loudspeaker 261, and a microphone 262 may provide audio interfaces between the user and the mobile phone 200. The audio circuit 260 may transmit, to the loudspeaker 261, an electric signal converted from received audio data. The loudspeaker 261 converts the electric signal into a sound signal for output. On the other hand, the microphone 262 converts a collected sound signal into an electric signal. The audio circuit 260 receives the electric signal and converts the electric signal into audio data, and outputs the audio data to the processor 280 for processing. Then, the processor 280 sends the audio data to, for example, another mobile phone through the RF circuit 210, or outputs the audio data to the memory 220 for further processing.

WIFI relates a short distance wireless transmission technology. The mobile phone 200 may facilitate, by using a WIFI module 271, a user to receive and send an e-mail, browse a webpage, and access stream media, and the like, which provides wireless broadband Internet access for the user.

The WIFI module 271 may implement the corresponding function of the WIFI antenna in the foregoing embodiment.

A GPS module 272 is configured to implement real-time positioning and navigation of the intelligent terminal globally by communicating with a GPS positioning satellite.

The GPS module 272 may implement the corresponding function of the WIFI antenna in the foregoing embodiment. Optionally, the WIFI module 271 and the GPS module 272 may be designed integrally to form a WIFI/GPS antenna.

The processor 280 is a control center of the mobile phone 200, and connects various parts of the mobile phone by using various interfaces and lines. By running or executing the software program and/or module stored in the memory 220, and invoking data stored in the memory 220, the processor 280 performs various functions and data processing of the mobile phone 200, thereby performing overall monitoring on the mobile phone. Optionally, the processor 280 may include one or more processing units. Preferably, the processor 280 may integrate an application processor and a modem processor. The application processor mainly processes an operating system, a user interface, an application program, and the like. The modem processor mainly processes wireless communication. It may be understood that, the foregoing modem processor may not be integrated into the processor 280.

The mobile phone 200 further includes the power supply 290 (such as a battery) for supplying power to the components. Preferably, the power supply may be logically connected to the processor 280 through a power supply management system, thereby implementing functions, such as charging, discharging, and power consumption management, by using the power supply management system.

Although not shown in the figure, the mobile phone 200 may further include a camera, a Bluetooth module, and the like, which are not further described herein.

In this embodiment of the present disclosure, the processor 280 included in the terminal has the following functions:
the corresponding function of respective front-end modules in the foregoing embodiment; and
the corresponding functions of the antenna matrix management switch module in the foregoing embodiment.

Further, the foregoing antenna matrix management switch module is divided into a determining module, a function sorting module, and an antenna sorting module according to their functions. The processor 280 may implement corresponding functions of the determining module, the function sorting module, and the antenna sorting module according to corresponding programs and data.

Specifically, the processor 280 is configured to run at least three front-end modules with different application functions; obtain a first antenna module corresponding to a first front-end module; and control the first front-end module and the first antenna module to match each other when the first antenna module meets a switching condition, and perform data interaction through the first antenna module;

The first front-end module is a front-end module selected from a first set according to a first selection rule; the first antenna module is an antenna module selected from a second set according to a second selection rule; the first set is a set of all front-end modules; the second set is a set of all antenna modules; the first selection rule is set for selecting a front-end module with the highest priority currently according to a priority order for front-end modules; and the second selection rule is set for selecting an antenna module with the current highest priority according to a priority order for antenna modules.

Described above is an adaptive antenna switching system according to Embodiment 7 of the present disclosure. The processor runs at least three front-end modules with different application functions. The processor calculates a first front-end module currently used by a user and a first antenna module according to a state of the current usage scene of the user; when a switching condition is met, matching of the first front-end module with the first antenna module is implemented, and data interaction is performed through the first antenna module. Then, the processor further implements matching of other front-end modules with other antenna modules, except the first front-end module and the first antenna module, which comprises: firstly, a front-end module with the highest priority currently and an antenna module with the highest priority currently are calculated; secondly, when a switching condition is met, matching of the front-end module with the highest priority currently with the antenna module having the highest priority currently is implemented, where the antenna module having the highest priority currently may be considered as an antenna module having optimal-performance currently available. Finally, matching communication between all currently used front-end modules and corresponding antenna modules are implemented. In this embodiment, after priorities of all the front-end modules and all the antenna modules are sorted, one or more front-end modules meeting the switching condition are enabled to communicate with antenna modules corresponding thereto. Overall power consumption of the intelligent terminal is not greatly affected while usage satisfaction of the user is ensured, and thus the utilization of each antenna module is maximized.

Further, the processor 280 is configured to:
obtain a second antenna module corresponding to a second front-end module; and
control the second front-end module and the second antenna module to match each other when the second antenna module meets the switching condition, and perform data interaction through the second antenna module;
where the second front-end module is a front-end module selected from a third set according to the first selection rule; the second antenna module is an antenna module selected from a fourth set according to the second selection rule; the third set is a set of all unmatched front-end modules in the first set; and the fourth set is a set of all unmatched antenna modules in the second set.

Optionally, before obtaining the first antenna module corresponding to the first front-end module, the processor 280 controls the first front-end module to perform data interaction through a third antenna module, the third antenna module being an antenna module currently used by the first front-end module.

The processor 280 is further configured to confirm that the third antenna module meets a switching triggering condition.

Further, the processor 280 confirming that the third antenna module meets a switching triggering condition specifically includes:
the processor 280 determines, within a sampling cycle, if a receiving signal strength value of the third antenna module exceeds a receiving signal strength threshold for antenna or if a transmission power value of the third antenna module exceeds transmission power threshold for antenna; and
the processor 280 confirms that the third antenna module meets the switching triggering condition if the receiving signal strength value of the third antenna module exceeds the receiving signal strength threshold for antenna or if the transmission power value of the third antenna module exceeds the transmission power threshold for antenna.

Optionally, the processor 280 is further configured to determine if a power difference value between the first antenna module and the third antenna module is greater than or equal to a power difference threshold;
the processor 280 determines if an estimated switching time of the first antenna module is less than a cycle threshold, if the power difference value between the first antenna module and the third antenna module is greater than or equal to the power difference threshold; and
the processor 280 confirms that the first antenna module meets the switching condition when the estimated switching time of the first antenna module is less than the cycle threshold.

Optionally, the processor 280 determining that the first antenna module meets the switching condition specifically includes:
the processor 280 determines if a receiving power level difference value between the first antenna module and the third antenna module is greater than or equal to a receiving power level difference threshold;
the processor 280 determines if an estimated switching time of the first antenna module is less than a cycle threshold, if the receiving power level difference value between the first antenna module and the third antenna module is greater than or equal to the receiving power level difference threshold; and the processor 280 confirms that the first antenna module meets the switching condition if the estimated switching time of the first antenna module is less than the cycle threshold.

Optionally, the processor 280 is further configured to determine a currently used front-end module among all the front-end modules; and configure a priority of the currently used front-end module to be the highest in the priority order for the front-end modules.

Optionally, the processor 280 is further configured to obtain start time for current usage of each front-end module; and sort priorities of the front-end modules in ascending order according to a chronological order of the start time for current usage of respective front-end modules.

Optionally, the processor 280 is further configured to sort priorities of the antenna modules in descending order according to average strength values of all the antenna modules within a sampling cycle, to form the priority order for antenna modules.

The average strength value of each antenna module is specifically calculated as follows:

$$I_{vi} = \frac{avgRSSI_i - avgTX_i}{2},$$

wherein $avgRSSI_i$ is an average receiving signal strength value of an ith antenna module within the sampling cycle, $avgTX_i$ is an average transmission power value of the ith antenna module within the sampling cycle, wherein i=1, 2, etc.

Optionally, in the process of the processor 280 determining if a power difference value between the first antenna module and the third antenna module is greater than or equal to a power difference threshold:
the power difference between the first antenna module and the third antenna module is specifically calculated as follows:

$$\Delta \frac{avgRSSI - avgTX}{2} = \frac{avgRSSI_{optim} - avgTX_{optim}}{2} - \frac{avgRSSI_{former} - avgTX_{former}}{2};$$

wherein $avgRSSI_{optim}$ is an average receiving signal strength value of the first antenna module within a sampling cycle, and $avgTX_{optim}$ is an average transmission power value of the first antenna module within the sampling cycle; and $avgRSSI_{former}$ is an average receiving signal strength value of the third antenna module within the sampling cycle, and $avgTX_{former}$ is an average transmission power value of the third antenna module within the sampling cycle.

Optionally, the processor 280 determining if an estimated switching time of the first antenna module is less than a cycle threshold, if the power difference value between the first antenna module and the third antenna module is greater than or equal to the power difference threshold, specifically comprises:
the processor 280 determines if the estimated switching time of the first antenna module is less than the cycle threshold, if $$\Delta \frac{avgRSSI - avgTX}{2}$$

is greater than or equal to the power difference threshold; or

The processor 280 determining if an estimated switching time of the first antenna module is less than a cycle threshold, if the receiving power level difference value between the first antenna module and the third antenna module is greater than or equal to the receiving power level difference threshold, specifically comprises:

the processor 280 determines if the estimated switching time of the first antenna module is less than the cycle threshold, if the receiving power level difference value between the first antenna module and the third antenna module is greater than or equal to the receiving power level difference threshold;

wherein the estimated switching time T1 is:

$$T1 = \Delta \frac{avgRSSI - avgTX}{2} \cdot bwt,$$

wherein, bwt representing an antenna residence time;

$$\Delta \frac{avgRSSI - avgTX}{2} = \frac{avgRSSI_{optim} - avgTX_{optim}}{2} - \frac{avgRSSI_{former} - avgTX_{former}}{2};$$

wherein avgRSSI$_{optim}$ is an average receiving signal strength value of the first antenna module within a sampling cycle, and avgTX$_{optim}$ is an average transmission power value of the first antenna module within the sampling cycle; and avgRSSI$_{former}$ is an average receiving signal strength value of the third antenna module within the sampling cycle, and avgTX$_{former}$ is an average transmission power value of the third antenna module within the sampling cycle.

Data such as thresholds, sets, priorities, and priority orders in the foregoing may be all stored in the memory 220, so as to be invoked by the processor 280.

Specific embodiments of the present disclosure are described above. However, a person skilled in the art should understand that the embodiments are merely examples for description, and various changes and modifications may be made to the embodiments without departing from the principle and essence of the present disclosure. Therefore, the protection scope of the present disclosure is defined by the appended claims.

What is claimed is:

1. An adaptive antenna switching method, comprising steps of:

obtaining a first antenna module corresponding to a first front-end module; and matching the first front-end module with the first antenna module when the first antenna module meets a switching condition, and performing data interaction through the first antenna module;

wherein the first front-end module is a front-end module selected from a first set according to a first selection rule; the first antenna module is an antenna module selected from a second set according to a second selection rule; the first set is a set of all front-end modules; the second set is a set of all antenna modules; the first selection rule is set for selecting a front-end module with the highest priority currently according to a priority order for front-end modules; and the second selection rule is used for selecting an antenna module with the highest priority currently according to a priority order for antenna modules.

2. The adaptive antenna switching method according to claim 1, wherein the method comprises:

obtaining a second antenna module corresponding to a second front-end module; and matching the second front-end module with the second antenna module when the second antenna module meets the switching condition, and performing data interaction through the second antenna module;

wherein the second front-end module is a front-end module selected from a third set according to the first selection rule; the second antenna module is an antenna module selected from a fourth set according to the second selection rule; the third set is a set of all unmatched front-end modules in the first set; and the fourth set is a set of all unmatched antenna modules in the second set; or the method further comprises the following steps before obtaining a first antenna module corresponding to a first front-end module:

performing data interaction of the first front-end module through a third antenna module, the third antenna module being an antenna module currently used by the first front-end module; and confirming that the third antenna module meets a switching triggering condition.

3. The adaptive antenna switching method according to claim 2, wherein the confirming that the third antenna module meets a switching triggering condition comprises:

determining, within a sampling cycle, if a receiving signal strength value of the third antenna module exceeds a receiving signal strength threshold for antenna or if a transmission power value of the third antenna module exceeds a transmission power threshold for antenna; and confirming that the third antenna module meets the switching triggering condition if the receiving signal strength value of the third antenna module exceeds the receiving signal strength threshold for antenna or if the transmission power value of the third antenna module exceeds the transmission power threshold for antenna.

4. The adaptive antenna switching method according to claim 2, wherein confirming that the first antenna module meets a switching condition comprises:

determining if a power difference value between the first antenna module and the third antenna module is greater than or equal to a power difference threshold; determining if an estimated switching time of the first antenna module is less than a cycle threshold, if the power difference value between the first antenna module and the third antenna module is greater than or equal to the power difference threshold; and confirming that the first antenna module meets the switching condition if the estimated switching time of the first antenna module is less than the cycle threshold; or determining if a receiving power level difference value between the first antenna module and the third antenna module is greater than or equal to a receiving power level difference threshold; determining if an estimated switching time of the first antenna module is less than a cycle threshold, if the receiving power level difference value between the first antenna module and the third antenna module is greater than or equal to the receiving power level difference threshold; and confirming that the first antenna module meets the switching condition, if the estimated switching time of the first antenna module is less than the cycle threshold.

5. The adaptive antenna switching method according to claim 1, further comprising:
determining a currently used front-end module among all the front-end modules;
setting a priority of the currently used front-end module to be the highest in the priority order for front-end modules; or
obtaining start time for current usage of each front-end module; and
sorting priorities of the front-end modules in ascending order according to a chronological order of the start time for current usage of respective front-end modules; or
sorting priorities of the antenna modules in descending order according to average strength values of all the antenna modules within a sampling cycle, to form the priority order for antenna modules;
wherein the average strength value of each antenna module is specifically calculated as follows:

$$I_{vi} = \frac{avgRSSI_i - avgTX_i}{2},$$

wherein $avgRSSI_i$ is an average receiving signal strength value of an $i^{th}$ antenna module within the sampling cycle, $avgTX_i$ is an average transmission power value of the $i^{th}$ antenna module within the sampling cycle, wherein i=1, 2, etc.

6. The adaptive antenna switching method according to claim 4, wherein, in the step of determining if a power difference value between the first antenna module and the third antenna module is greater than or equal to a power difference threshold:
the power difference between the first antenna module and the third antenna module is specifically calculated as follows:

$$\Delta \frac{avgRSSI - avgTX}{2} = \frac{avgRSSI_{optim} - avgTX_{optim}}{2} - \frac{avgRSSI_{former} - avgTX_{former}}{2};$$

wherein $avgRSSI_{optim}$ is an average receiving signal strength value of the first antenna module within a sampling cycle, and $avgTX_{optim}$ is an average transmission power value of the first antenna module within the sampling cycle; and
$avgRSSI_{former}$ is an average receiving signal strength value of the third antenna module within the sampling cycle, and $avgTX_{former}$ is an average transmission power value of the third antenna module within the sampling cycle.

7. The adaptive antenna switching method according to claim 4, wherein
the step of determining if an estimated switching time of the first antenna module is less than a cycle threshold, if the power difference value between the first antenna module and the third antenna module is greater than or equal to the power difference threshold, specifically comprises:
determining if the estimated switching time of the first antenna module is less than the cycle threshold, if $$\Delta \frac{avgRSSI - avgTX}{2}$$

is greater than or equal to the power difference threshold; or
the step of determining if an estimated switching time of the first antenna module is less than a cycle threshold, if the receiving power level difference value between the first antenna module and the third antenna module is greater than or equal to the receiving power level difference threshold, specifically comprises:
determining if the estimated switching time of the first antenna module is less than the cycle threshold, if the receiving power level difference value between the first antenna module and the third antenna module is greater than or equal to the receiving power level difference threshold;
wherein the estimated switching time T1 is:

$$T1 = \Delta \frac{avgRSSI - avgTX}{2} \cdot bwt,$$

wherein, bwt representing an antenna residence time;

$$\Delta \frac{avgRSSI - avgTX}{2} = \frac{avgRSSI_{optim} - avgTX_{optim}}{2} - \frac{avgRSSI_{former} - avgTX_{former}}{2};$$

wherein $avgRSSI_{optim}$ is an average receiving signal strength value of the first antenna module within a sampling cycle, and $avgTX_{optim}$ is an average transmission power value of the first antenna module within the sampling cycle; and
$avgRSSI_{former}$ is an average receiving signal strength value of the third antenna module within the sampling cycle, and $avgTX_{former}$ is an average transmission power value of the third antenna module within the sampling cycle.

8. An adaptive antenna switching system, comprising at least three front-end modules with different application functions, at least three antenna modules, and an antenna matrix management switch module, wherein
the antenna matrix management switch module obtains a first antenna module corresponding to a first front-end module;
the antenna matrix management switch module controls the first front-end module and the first antenna module to match each other when the first antenna module meets a switching condition and performs data interaction through the first antenna module;
wherein the first front-end module is a front-end module selected from a first set according to a first selection rule; the first antenna module is an antenna module selected from a second set according to a second selection rule; the first set is a set of all front-end modules; the second set is a set of all antenna modules; the first selection rule is set for selecting a front-end module with the highest priority currently according to a priority order for front-end modules; and the second selection rule is set for selecting an antenna module with the highest priority currently according to a priority order for antenna modules.

9. The adaptive antenna switching system according to claim 8, wherein the antenna matrix management switch module is further configured to:
  obtain a second antenna module corresponding to a second front-end module; and
  control the second front-end module and the second antenna module to match each other when the second antenna module meets the switching condition and perform data interaction through the second antenna module;
  wherein the second front-end module is a front-end module selected from a third set according to the first selection rule; the second antenna module is an antenna module selected from a fourth set according to the second selection rule; the third set is a set of all unmatched front-end modules in the first set; and the fourth set is a set of all unmatched antenna modules in the second set; or
  the first front-end module performs data interaction through a third antenna module, before the antenna matrix management switch module obtains the first antenna module corresponding to the first front-end module, the third antenna module being an antenna module currently used by the first front-end module; and
  the antenna matrix management switch module comprises:
  a first determining module configured for confirming that the third antenna module meets a switching triggering condition.

10. The adaptive antenna switching system according to claim 9, wherein the first determining module confirming that the third antenna module meets a switching triggering condition comprises:
  the first determining module determines within a sampling cycle if a receiving signal strength value of the third antenna module exceeds a receiving signal strength threshold for antenna or if a transmission power value of the third antenna module exceeds a transmission power threshold for antenna; and
  the first determining module confirms that the third antenna module meets the switching triggering condition if the receiving signal strength value of the third antenna module exceeds the receiving signal strength threshold for antenna or if the transmission power value of the third antenna module exceeds the transmission power threshold for antenna.

11. The adaptive antenna switching system according to claim 9, wherein the antenna matrix management switch module further comprises a second determining module configured for determining if the first antenna module meets the switching condition, wherein, the second determining module determining if the first antenna module meets the switching condition comprises:
  the second determining module determines if a power difference value between the first antenna module and the third antenna module is greater than or equal to a power difference threshold; the second determining module determines if an estimated switching time of the first antenna module is less than a cycle threshold, if the power difference value between the first antenna module and the third antenna module is greater than or equal to the power difference threshold; and the second determining module confirms that the first antenna module meets the switching condition if the estimated switching time of the first antenna module is less than the cycle threshold; or
  the second determining module determines if a receiving power level difference value between the first antenna module and the third antenna module is greater than or equal to a receiving power level difference threshold; the second determining module determines if an estimated switching time of the first antenna module is less than a cycle threshold, if the receiving power level difference value between the first antenna module and the third antenna module is greater than or equal to the receiving power level difference threshold; and the second determining module confirms that the first antenna module meets the switching condition, if the estimated switching time of the first antenna module is less than the cycle threshold.

12. The adaptive antenna switching system according to claim 8, wherein the antenna matrix management switch module further comprises: a function sorting module;
  the function sorting module determines a currently used front-end module among all the front-end modules;
  the function sorting module sets a priority of the currently used front-end module to be the highest in the priority order for front-end modules; or
  the function sorting module obtains a start time for current usage of each front-end module; and
  the function sorting module sorts priorities of the front-end modules in ascending order according to a chronological order of the start time for current usage of front-end modules; or
  the antenna matrix management switch module further comprises an antenna sorting module;
  the antenna sorting module sorts priorities of the antenna modules in descending order according to average strength values of all the antenna modules within a sampling cycle, to form the priority order for antenna modules;
  wherein the average strength value of each antenna module is specifically calculated as follows:

$$I_{vi} = \frac{avgRSSI_i - avgTX_i}{2},$$

wherein $avgRSSI_i$ is an average receiving signal strength value of an $i^{th}$ antenna module within the sampling cycle, $avgTX_i$ is an average transmission power value of the $i^{th}$ antenna module within the sampling cycle, wherein i=1, 2, etc.

13. The adaptive antenna switching system according to claim 11, wherein in the determining module determining if a power difference value between the first antenna module and the third antenna module is greater than or equal to a power difference threshold:
  the power difference between the first antenna module and the third antenna module is specifically calculated as follows:

$$\Delta \frac{avgRSSI - avgTX}{2} = \frac{avgRSSI_{optim} - avgTX_{optim}}{2} - \frac{avgRSSI_{former} - avgTX_{former}}{2};$$

wherein avgRSSI$_{optim}$ is an average receiving signal strength value of the first antenna module within a sampling cycle, and avgTX$_{optim}$ is an average transmission power value of the first antenna module within the sampling cycle; and avgRSSI$_{former}$ is an average receiving signal strength value of the third antenna module within the sampling cycle, and avgTX$_{former}$ is an average transmission power value of the third antenna module within the sampling cycle.

14. The adaptive antenna switching system according to claim 11, wherein the second determining module determining if an estimated switching time of the first antenna module is less than a cycle threshold, if the power difference value between the first antenna module and the third antenna module is greater than or equal to the power difference threshold, specifically comprises:

the second determining module determines if the estimated switching time of the first antenna module is less than the cycle threshold, if $$\Delta \frac{avgRSSI - avgTX}{2}$$

is greater than or equal to the power difference threshold; or the second determining module determining if an estimated switching time of the first antenna module is less than a cycle threshold, if the receiving power level difference value between the first antenna module and the third antenna module is greater than or equal to the receiving power level difference threshold, specifically comprises:

the second determining module determines if the estimated switching time of the first antenna module is less than the cycle threshold, if the receiving power level difference value between the first antenna module and the third antenna module is greater than or equal to the receiving power level difference threshold;

wherein the estimated switching time T1 is:

$$T1 = \Delta \frac{avgRSSI - avgTX}{2} \cdot bwt,$$

wherein, bwt representing an antenna residence time;

$$\Delta \frac{avgRSSI - avgTX}{2} = \frac{avgRSSI_{optim} - avgTX_{optim}}{2} - \frac{avgRSSI_{former} - avgTX_{former}}{2};$$

wherein avgRSSI$_{optim}$ is an average receiving signal strength value of the first antenna module within a sampling cycle, and avgTX$_{optim}$ is an average transmission power value of the first antenna module within the sampling cycle; and avgRSSI$_{former}$ is an average receiving signal strength value of the third antenna module within the sampling cycle, and avgTX$_{former}$ is an average transmission power value of the third antenna module within the sampling cycle.

15. An intelligent terminal, comprising an adaptive antenna switching system according to claim 8.

16. An adaptive antenna switching system, comprising: a processor and at least three antenna modules, wherein, the processor is configured to run at least three front-end modules with different application functions; obtain a first antenna module corresponding to a first front-end module; and control the first front-end module and the first antenna module to match each other when the first antenna module meets a switching condition and perform data interaction through the first antenna module;

wherein the first front-end module is a front-end module selected from a first set according to a first selection rule; the first antenna module is an antenna module selected from a second set according to a second selection rule; the first set is a set of all front-end modules; the second set is a set of all antenna modules; the first selection rule is set for selecting a front-end module with the current highest priority according to a priority order for front-end modules; and the second selection rule is set for selecting an antenna module with the current highest priority according to a priority order for antenna modules.

17. The adaptive antenna switching system according to claim 16, wherein the processor is configured to obtain a second antenna module corresponding to a second front-end module; and control the second front-end module and the second antenna module to match each other when the second antenna module meets the switching condition and perform data interaction through the second antenna module;

wherein the second front-end module is a front-end module selected from a third set according to the first selection rule; the second antenna module is an antenna module selected from a fourth set according to the second selection rule; the third set is a set of all unmatched front-end modules in the first set; and the fourth set is a set of all unmatched antenna modules in the second set; or the processor controls the first front-end module to perform data interaction through a third antenna module, before obtaining the first antenna module corresponding to the first front-end module, the third antenna module being an antenna module currently used by the first front-end module; and the processor is further configured to confirm that the third antenna module meets a switching triggering condition.

18. The adaptive antenna switching system according to claim 17, wherein the processor confirming that the third antenna module meets a switching triggering condition specifically comprises:

the processor determines, within a sampling cycle, if a receiving signal strength value of the third antenna module exceeds a receiving signal strength threshold for antenna or if a transmission power value of the third antenna module exceeds transmission power threshold for antenna; and the processor confirms that the third antenna module meets the switching triggering condition if the receiving signal strength value of the third antenna module exceeds the receiving signal strength threshold for antenna or if the transmission power value of the third antenna module exceeds the transmission power threshold for antenna.

19. The adaptive antenna switching system according to claim 17, wherein the processor is further configured to determine if a power difference value between the first antenna module and the third antenna module is greater than or equal to a power difference threshold; the processor determines if an estimated switching time of the first antenna module is less than a cycle threshold, if the power difference value between the first antenna module and the third antenna module is greater than or equal to the power difference threshold; and the processor confirms that the first antenna module meets the switching condition if the estimated switching time of the first antenna module is less than the cycle threshold; or the processor determines if a receiving power level difference value between the first antenna module and the third antenna module is greater than or equal to a receiving power level difference threshold; the second determining module determines if an estimated switching time of the first antenna module is less than a cycle threshold, if the receiving power level difference value between the first antenna module and the third antenna module is greater than or equal to the receiving power level difference threshold; and the second determining module confirms that the first antenna module meets the switching condition, if the estimated switching time of the first antenna module is less than the cycle threshold; or the processor is further configured to determine a currently used front-end module among all the front-end modules, and set a priority of the currently used front-end module to be the highest in the priority order for front-end modules; or the processor is further configured to obtain start time for current usage of each front-end module;

and sort priorities of the front-end modules in ascending order according to a chronological order of the start time for current usage of respective front-end modules; or the processor is further configured to sort priorities of the antenna modules in descending order according to average strength values of all the antenna modules within a sampling cycle, to form the priority order for antenna modules;

wherein the average strength value of each antenna module is specifically calculated as follows:

$$I_{vi} = \frac{avgRSSI_i - avgTX_i}{2},$$

wherein $avgRSSI_i$ is an average receiving signal strength value of an $i^{th}$ antenna module within the sampling cycle, $avgTX_i$ is an average transmission power value of the $i^{th}$ antenna module within the sampling cycle, wherein i=1, 2, etc.

20. The adaptive antenna switching system according to claim 19, wherein in the process of the processor determining if a power difference value between the first antenna module and the third antenna module is greater than or equal to a power difference threshold:

the power difference between the first antenna module and the third antenna module is specifically calculated as follows:

$$\Delta \frac{avgRSSI - avgTX}{2} = \frac{avgRSSI_{optim} - avgTX_{optim}}{2} - \frac{avgRSSI_{former} - avgTX_{former}}{2};$$

wherein $avgRSSI_{optim}$ is an average receiving signal strength value of the first antenna module within a sampling cycle, and $avgTX_{optim}$ an average transmission power value of the first antenna module within the sampling cycle; and $avgRSSI_{former}$ is an average receiving signal strength value of the third antenna module within the sampling cycle, and $avgTX_{former}$ is an average transmission power value of the third antenna module within the sampling cycle; or the processor determining if an estimated switching time of the first antenna module is less than a cycle threshold, if the power difference value between the first antenna module and the third antenna module is greater than or equal to the power difference threshold, specifically comprises:

the processor determines if the estimated switching time of the first antenna module is less than the cycle threshold, if $$\Delta \frac{avgRSSI - avgTX}{2}$$

is greater than or equal to the power difference threshold; or the processor determining if an estimated switching time of the first antenna module is less than a cycle threshold, if the receiving power level difference value between the first antenna module and the third antenna module is greater than or equal to the receiving power level difference threshold, specifically comprises:

the processor determines if the estimated switching time of the first antenna module is less than the cycle threshold, if the receiving power level difference value between the first antenna module and the third antenna module is greater than or equal to the receiving power level difference threshold;

wherein the estimated switching time T1 is:

$$T1 = \Delta \frac{avgRSSI - avgTX}{2} \cdot bwt,$$

wherein, bwt representing an antenna residence time;

$$\Delta \frac{avgRSSI - avgTX}{2} = \frac{avgRSSI_{optim} - avgTX_{optim}}{2} - \frac{avgRSSI_{former} - avgTX_{former}}{2};$$

wherein $avgRSSI_{optim}$ is an average receiving signal strength value of the first antenna module within a sampling cycle, and $avgTX_{optim}$ is an average transmission power value of the first antenna module within the sampling cycle; and $avgRSSI_{former}$ is an average receiving signal strength value of the third antenna module within the sampling cycle, and $\text{avgTX}_{former}$ an average transmission power value of the third antenna module within the sampling cycle.

\* \* \* \* \*